US008760397B2

(12) United States Patent
Robbins et al.

(10) Patent No.: US 8,760,397 B2
(45) Date of Patent: Jun. 24, 2014

(54) CONTROL SYSTEM FOR A REMOTE VEHICLE

(71) Applicant: iRobot Corporation, Bedford, MA (US)

(72) Inventors: Michael Anthony Robbins, Waltham, MA (US); Samuel H. Kenyon, Cambridge, MA (US); Roger Gerson, Medfield, MA (US); Travis Woodbury, Temple, NH (US); Melissa N. Ledoux, Revere, MA (US)

(73) Assignee: iRobot Corporation, Bedford, MA (US)

( * ) Notice: Subject to any disclaimer, the term of this patent is extended or adjusted under 35 U.S.C. 154(b) by 0 days.

(21) Appl. No.: 13/705,417

(22) Filed: Dec. 5, 2012

(65) Prior Publication Data

US 2013/0166107 A1    Jun. 27, 2013

Related U.S. Application Data

(63) Continuation of application No. 13/459,035, filed on Apr. 27, 2012, now Pat. No. 8,350,810, which is a continuation of application No. 12/911,080, filed on Oct. 25, 2010, now Pat. No. 8,199,109, which is a continuation of application No. 11/739,590, filed on Apr. 24, 2007, now Pat. No. 7,843,431.

(51) Int. Cl.
*G09G 5/00*     (2006.01)
*G06F 3/02*     (2006.01)

(52) U.S. Cl.
USPC ............... 345/156; 345/169; 436/36; 463/40

(58) Field of Classification Search
USPC ........................ 345/156, 169; 436/36; 463/40
See application file for complete search history.

(56) References Cited

U.S. PATENT DOCUMENTS

| 4,408,103 A | 10/1983 | Smith, III |
| 4,490,587 A | 12/1984 | Miller et al. |

(Continued)

FOREIGN PATENT DOCUMENTS

| GB | 2128842 | 5/1984 |
| JP | 11149315 | 6/1999 |

(Continued)

OTHER PUBLICATIONS

Translated Israeli Office Action for Patent Application No. 201431 dated Aug. 13, 2013.

(Continued)

*Primary Examiner* — Kevin M Nguyen
(74) *Attorney, Agent, or Firm* — Honigman Miller Schwartz and Cohn LLP

(57) ABSTRACT

A hand-held controller for operating a remote vehicle includes a controller body having right and left grips, a first set of input devices are disposed in a left control zone adjacent the left grip, and a second set of input devices are disposed in a right control zone adjacent the right grip. The first set of input devices includes a first analog joystick, a 4-way directional control, and a left rocker control. The second set of input devices includes a second analog joystick, an array of at least four buttons, and a right rocker control. The hand-held controller also includes a mode changer disposed on the controller body and configured to receive an input to change between two or more function modes. Each function mode assigns different functions to one or more of the input devices.

20 Claims, 23 Drawing Sheets

(56) References Cited

U.S. PATENT DOCUMENTS

| | | | |
|---|---|---|---|
| 4,513,235 A | 4/1985 | Acklam et al. |
| 4,687,200 A | 8/1987 | Shirai |
| 4,730,684 A | 3/1988 | Pedersen |
| 4,896,003 A | 1/1990 | Hsieh |
| 4,947,461 A | 8/1990 | Yoshioka et al. |
| 4,975,547 A | 12/1990 | Nakayama et al. |
| 4,977,971 A | 12/1990 | Crane, III et al. |
| 4,992,631 A | 2/1991 | Gee |
| 5,022,812 A | 6/1991 | Coughlan et al. |
| 5,059,958 A | 10/1991 | Jacobs et al. |
| 5,164,554 A | 11/1992 | Ikunami |
| 5,174,405 A | 12/1992 | Carra et al. |
| 5,207,426 A | 5/1993 | Inoue et al. |
| 5,283,401 A | 2/1994 | Schmucker |
| 5,337,846 A | 8/1994 | Ogaki et al. |
| 5,394,168 A | 2/1995 | Smith, III et al. |
| 5,396,030 A | 3/1995 | Matsumiya et al. |
| 5,465,525 A | 11/1995 | Mifune et al. |
| 5,496,977 A | 3/1996 | Date et al. |
| 5,498,843 A | 3/1996 | Date et al. |
| 5,501,458 A | 3/1996 | Mallory |
| 5,511,147 A | 4/1996 | Abdei-Malek |
| 5,514,843 A | 5/1996 | Wilfong et al. |
| 5,525,770 A | 6/1996 | Matsumiya et al. |
| 5,536,911 A | 7/1996 | Madile |
| 5,551,693 A | 9/1996 | Goto et al. |
| 5,643,087 A | 7/1997 | Marcus et al. |
| 5,644,113 A | 7/1997 | Date et al. |
| 5,645,277 A | 7/1997 | Cheng |
| 5,652,849 A | 7/1997 | Conway et al. |
| 5,675,229 A | 10/1997 | Thorne |
| 5,698,825 A | 12/1997 | Karasik |
| 5,700,194 A | 12/1997 | Hsien |
| 5,716,274 A | 2/1998 | Goto et al. |
| 5,744,765 A | 4/1998 | Yamamoto |
| 5,759,100 A | 6/1998 | Nakanishi |
| 5,764,164 A | 6/1998 | Cartabiano et al. |
| 5,783,787 A | 7/1998 | Data |
| 5,785,317 A | 7/1998 | Sasaki |
| 5,812,050 A | 9/1998 | Figgins |
| 5,820,462 A | 10/1998 | Yokoi et al. |
| 5,853,326 A | 12/1998 | Goto et al. |
| 5,860,479 A | 1/1999 | LaFollette |
| 5,874,906 A | 2/1999 | Willner et al. |
| 5,889,242 A | 3/1999 | Ishihara et al. |
| 5,897,437 A | 4/1999 | Nishiumi et al. |
| 5,902,972 A | 5/1999 | Nestor et al. |
| 5,903,257 A | 5/1999 | Nishiumi et al. |
| 5,923,317 A | 7/1999 | Sayler et al. |
| 5,959,423 A | 9/1999 | Nakanishi et al. |
| RE36,349 E | 10/1999 | Matsumiya et al. |
| 5,984,785 A | 11/1999 | Takeda et al. |
| 5,984,880 A | 11/1999 | Lander et al. |
| 5,999,084 A | 12/1999 | Armstrong |
| 6,001,015 A | 12/1999 | Nishiumi et al. |
| 6,088,020 A | 7/2000 | Mor |
| 6,102,802 A | 8/2000 | Armstrong |
| 6,107,580 A | 8/2000 | Hoshikawa et al. |
| 6,108,031 A | 8/2000 | King et al. |
| 6,120,025 A | 9/2000 | Hughes, IV |
| 6,153,843 A | 11/2000 | Date et al. |
| 6,162,999 A | 12/2000 | Ishikawa et al. |
| 6,184,866 B1 | 2/2001 | Schrum et al. |
| 6,186,896 B1 | 2/2001 | Takeda et al. |
| 6,233,504 B1 | 5/2001 | Das et al. |
| 6,241,611 B1 | 6/2001 | Takeda et al. |
| 6,313,826 B1 | 11/2001 | Schrum et al. |
| 6,325,719 B1 | 12/2001 | Fukawa et al. |
| 6,332,840 B1 | 12/2001 | Nishiumi et al. |
| 6,339,735 B1 | 1/2002 | Peless et al. |
| 6,342,009 B1 | 1/2002 | Sorna |
| 6,343,991 B1 | 2/2002 | Armstrong |
| 6,344,791 B1 | 2/2002 | Armstrong |
| 6,352,477 B1 | 3/2002 | Soma et al. |
| 6,354,945 B1 | 3/2002 | Furuki et al. |
| 6,374,155 B1 | 4/2002 | Wallach et al. |
| 6,385,509 B2 | 5/2002 | Das et al. |
| 6,394,906 B1 | 5/2002 | Ogata |
| 6,409,600 B1 | 6/2002 | Sobota |
| 6,428,416 B1 | 8/2002 | Ogata |
| 6,461,242 B2 | 10/2002 | Takeda et al. |
| 6,493,613 B2 | 12/2002 | Peless et al. |
| 6,496,755 B2 | 12/2002 | Wallach et al. |
| 6,498,311 B1 | 12/2002 | Stewart et al. |
| 6,515,242 B2 | 2/2003 | Takatsuki |
| 6,524,186 B2 | 2/2003 | Takatsuka et al. |
| 6,535,793 B2 | 3/2003 | Allard |
| 6,563,415 B2 | 5/2003 | Armstrong |
| 6,585,595 B1 | 7/2003 | Soma |
| 6,589,118 B1 | 7/2003 | Soma et al. |
| 6,593,913 B1 | 7/2003 | Krohn et al. |
| 6,611,120 B2 | 8/2003 | Song et al. |
| 6,611,738 B2 | 8/2003 | Ruffner |
| 6,614,420 B1 | 9/2003 | Han et al. |
| 6,621,902 B2 | 9/2003 | Okuda |
| 6,622,920 B2 | 9/2003 | Ho et al. |
| 6,653,579 B2 | 11/2003 | Inoue et al. |
| 6,658,325 B2 | 12/2003 | Zweig |
| 6,659,870 B2 | 12/2003 | Sobota |
| 6,746,304 B1 | 6/2004 | Liu |
| 6,762,746 B2 | 7/2004 | Fukuda |
| 6,836,701 B2 | 12/2004 | McKee |
| 6,845,297 B2 | 1/2005 | Allard |
| 6,887,158 B2 | 5/2005 | Goto et al. |
| 6,917,356 B1 | 7/2005 | Nishiumi et al. |
| 6,923,443 B1 | 8/2005 | Hughes, IV |
| 6,925,357 B2 | 8/2005 | Wang et al. |
| 6,933,861 B2 | 8/2005 | Wang |
| 7,046,229 B1 | 5/2006 | Drake |
| 7,050,798 B2 | 5/2006 | Ranta |
| 7,054,716 B2 | 5/2006 | McKee et al. |
| 7,063,321 B2 | 6/2006 | Hussaini et al. |
| 7,102,618 B2 | 9/2006 | Nishiumi et al. |
| 7,154,484 B2 | 12/2006 | Kamala |
| 2001/0048762 A1* | 12/2001 | Matsuura et al. ............. 382/154 |
| 2002/0148871 A1 | 10/2002 | Nakano et al. |
| 2002/0160654 A1 | 10/2002 | Kwoka |
| 2004/0058733 A1* | 3/2004 | Hussaini et al. ............. 463/47 |
| 2004/0227819 A1 | 11/2004 | Houlberg |
| 2005/0192721 A1 | 9/2005 | Jouppi |
| 2005/0216182 A1 | 9/2005 | Hussain et al. |
| 2006/0125806 A1 | 6/2006 | Voyles et al. |
| 2006/0176660 A1 | 8/2006 | Amiri |
| 2006/0226298 A1 | 10/2006 | Pierson |
| 2007/0070072 A1 | 3/2007 | Templeman |
| 2007/0260338 A1* | 11/2007 | Tseng ............................. 700/70 |
| 2008/0009970 A1* | 1/2008 | Bruemmer ................... 700/245 |
| 2008/0096654 A1 | 4/2008 | Mondesir |

FOREIGN PATENT DOCUMENTS

| | | |
|---|---|---|
| JP | 20094373 | 4/2000 |
| WO | WO 9905580 | 2/1999 |

OTHER PUBLICATIONS

Barnes, Mitch et al., "ThrowBot: Design Considerations for a Man-Portable Throwable Robot", In Proceedings of SPIE vol. 5804, Mar. 2005.

Cheung, Carol et al., "UAV-UGV Collaboration with a PackBot UGV and Raven SUAV for Pursuit and Tracking of a Dynamic Target". In Proceedings of SPIE Defense and Security Conference, Orlando, FL, Mar. 2008.

Jones, Chris et al., "Sentinel: An Operator Interface for the Control of Multiple Semi-Autonomous UGVs", In Proceedings of the Association for Unmanned Vehicles Systems International, Orlando, FL, Aug. 2006.

Lenser, Scott et al., "Practical Problems in Sliding Scale Autonomy: A Case Study". In Proceedings of SPIE Defense and Security Conference, Orlando, FL, Mar. 2008.

Murray, Sean et al., "Continued Research in EVA, Navigation, Network and Communications Systems", SAE Proceedings, International Conference on Environmental Systems, Jun. 2008.

(56) References Cited

OTHER PUBLICATIONS

Ohashi et al., The Sensor Arm and the Sensor Glove II—Haptic Devices for VR Interface, IEEE/ASME International Conference on Advanced Intelligent Mechatronics, Sep. 19-23, 1999, Atlanta, USA.

Rudakevych, Pablo et al., "A man portable hybrid UAV/UGV system", In Proceedings of SPIE vol. 6561, Mar. 2007.

Rudakevych, Pavlo et al., "Integration of the Fido Explosives Detector onto the PackBot EOD UGV", In Proceedings of SPIE vol. 6561, Mar. 2007.

Rudakevych, Pavlo et al., "Micro Unattended Mobility System (MUMS)", In Proceedings of SPIE vol. 3713, Jul. 1998.

Rudakevych, Pavlo et al., "PackBot EOD Firing System", In Proceedings of SPIE vol. 5804, Mar. 2005.

Rudakevych, Pavlo, "Wave Control: A Method of Distributed Control for Repeated Unit Tentacles", In Proceedings of SPIE vol. 3839, Aug. 1999.

Schoenfeld, Erik et al., "Door Breaching Robotic Manipulator". In Proceedings of SPIE Defense and Security Conference, Orlando, FL, Mar. 2008.

Shimoga et al., Touch and Force Reflection for Telepresence Surgery, 1994, IEEE, pp. 1049-1050.

Sword, Lee et al., "Mobility Enhancements for Ballistically Deployed Sensors", In Proceedings of SPIE vol. 4393, Apr. 2001.

Yamauchi, Brian "All-Weather Perception for Small Autonomous UGVs". In Proceedings of SPIE Defense and Security Conference, Orlando, FL, Mar. 2008.

Yamauchi, Brian, "Autonomous Urban Reconnaissance Using Man-Portable UGVs", In Proceedings of SPIE: Unmanned Ground Vehicle Technology VIII, Orlando, FL, Apr. 2006.

Yamauchi, Brian, "Daredevil: Ultra Wideband Radar Sensing for Small UGVs", In Proceedings of SPIE: Unmanned Systems Technology IX, Orlando, FL, Apr. 2007.

Yamauchi, Brian, "Griffon: a man-portable hybrid UGV/UAV", In Industrial Robot: An International Journal, vol. 31 No. 5, 2004.

Yamauchi, Brian, "PackBot: A Versatile Platform for Military Robotics", In Proceedings of SPIE vol. 5422: Unmanned Ground Technology VII, Orlando, FL, Apr. 2004.

Yamauchi, Brian, "The Wayfarer Modular Navigation Payload for Intelligent Robot Infrastructure", In Proceedings of SPIE vol. 5804: Unmanned Ground Technology VII, Orlando, FL, Mar. 2005.

Yamauchi, Brian, "Wayfarer: An Autonomous Navigation Payload for the PackBot", In Proceedings of SPIE: Unmanned Vehicles North America 2005, Baltimore, MD, Jun. 2005.

Office Action dated Mar. 22, 2011 from U.S. Patent No. 7,843,431.

Office Action dated Sep. 29, 2011 from U.S. Patent No. 8,199,109.

* cited by examiner

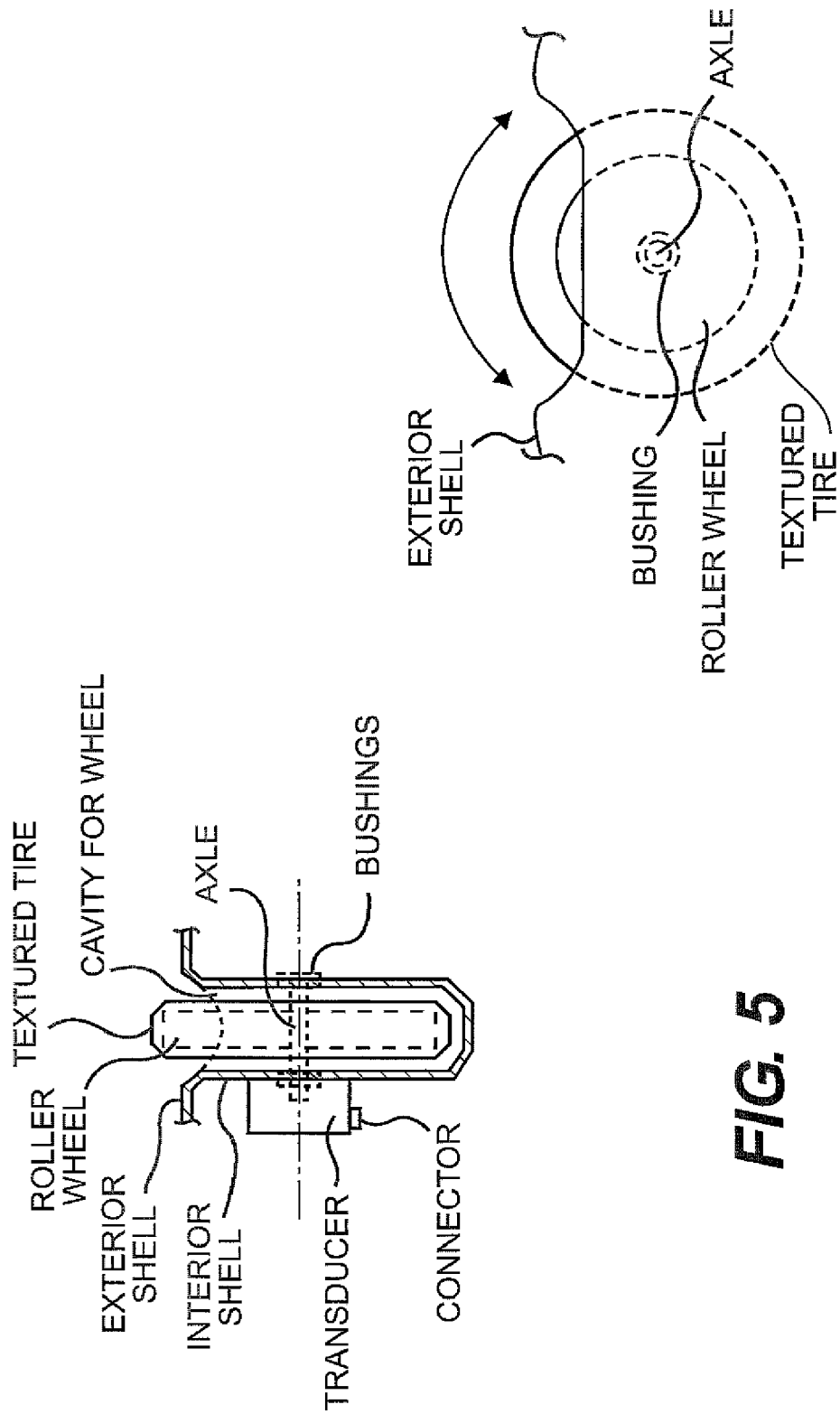

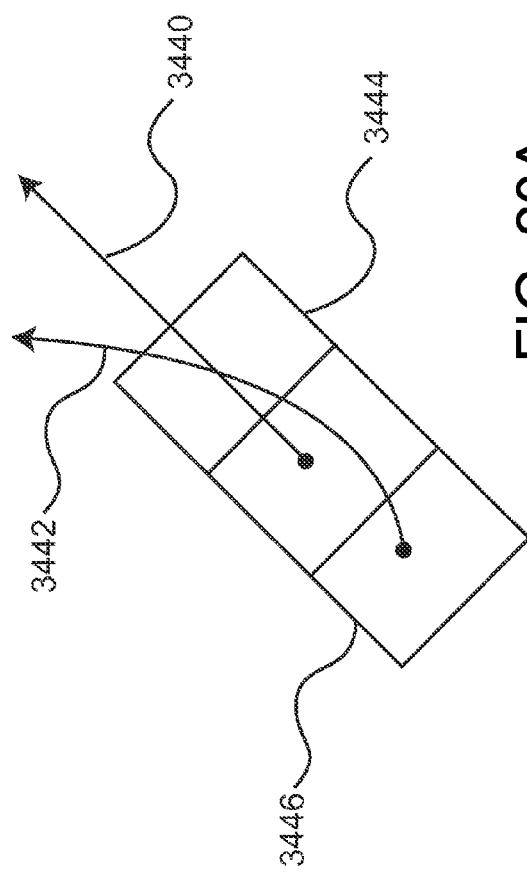
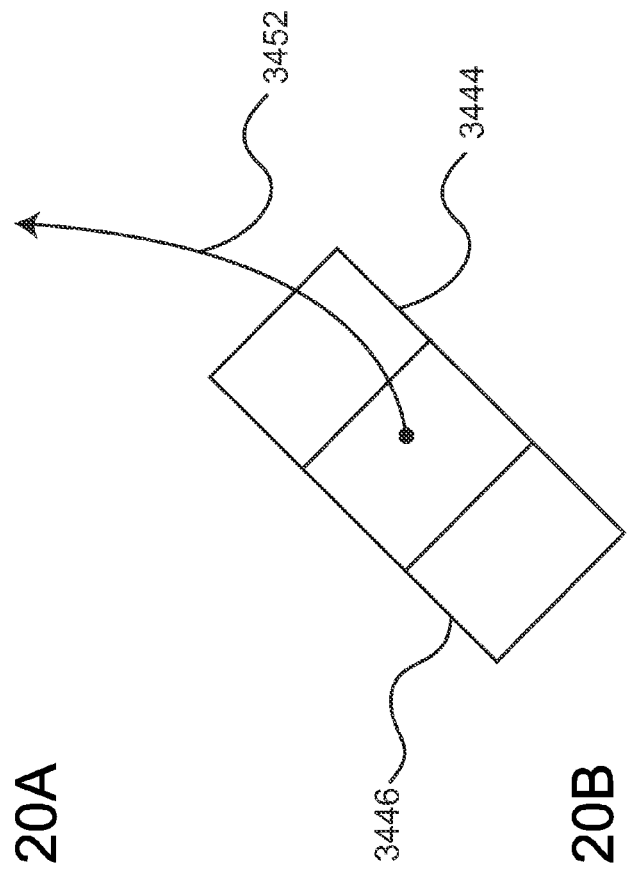

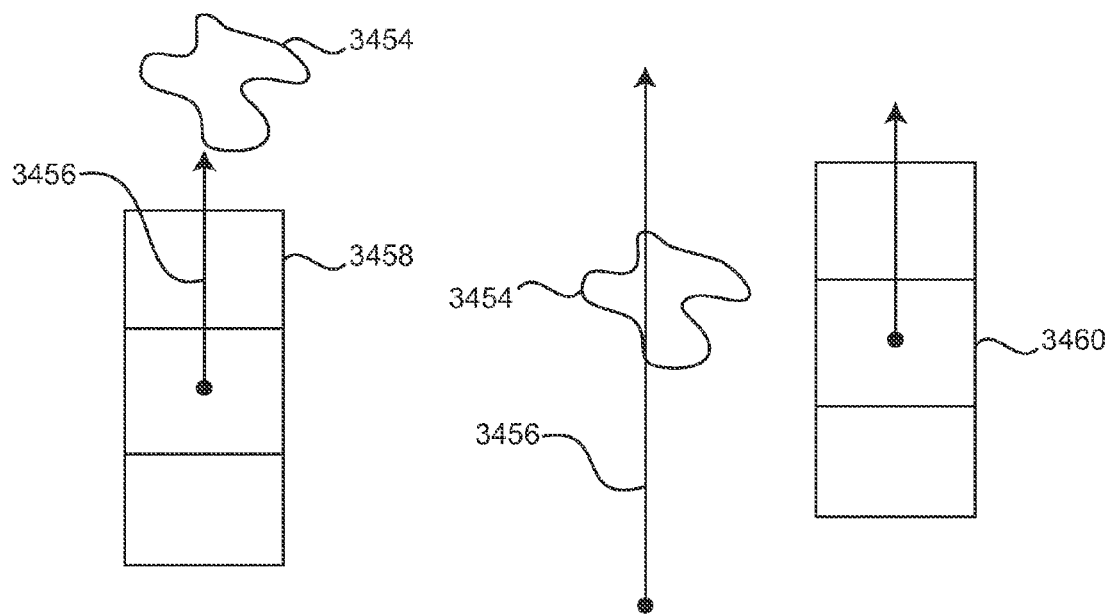
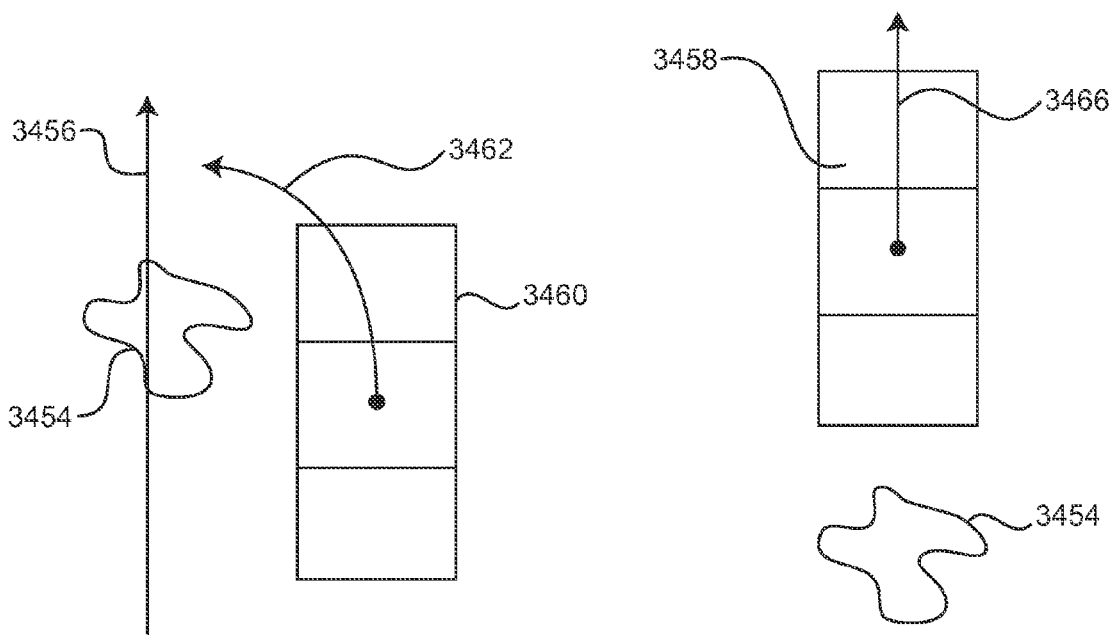

CONTROL SYSTEM FOR A REMOTE VEHICLE

CROSS REFERENCE TO RELATED APPLICATIONS

This U.S. Patent Application is a continuation of, and claims priority under 35 U.S.C. §120 from, U.S. patent application Ser. No. 13/459,035, filed on Apr. 27, 2012, which is a continuation of application Ser. No. 12/911,080, filed Oct. 25, 2010 (now U.S. Pat. No. 8,199,109, issued Jun. 12, 2012), which is a continuation application of application Ser. No. 11/739,590, filed Apr. 24, 2007 (now U.S. Pat. No. 7,843,431, issued Nov. 30, 2010). The disclosures of these prior applications are considered part of the disclosure of this application and are hereby incorporated by reference in their entireties.

TECHNICAL FIELD

This disclosure relates generally to controlling a remote vehicle, and more particularly to an improved system for remotely controlling one or more vehicles in real time from a dismounted position.

BACKGROUND

Improving user experience with remote vehicle interfaces is an ongoing area of development. Particular areas of concern include optimizing mission-critical response time, minimizing training and logistics support, minimizing complexity, attaining an ideal weight, size, and simplicity while increasing durability and reliability, and the ability to integrate the control system into gear normally worn or carried by the user.

Users can be burdened by large amounts of equipment and gear. For example, typical military gear includes an Outer Tactical Vest (OTV) and weapons such as an M16 or an M4 carbine. Gear often additionally includes one or more of ammunition, first aid kits, hip- or back-worn canteens, gas masks, radios, and/or monocles. Such equipment is commonly stored and carried in or on specific military gear; for example, MOLLE ruck sacks (Army) or Improved Load Bearing Equipment (ILBE) Assault Packs (Marines). The most critical equipment is preferably located within immediate arms' reach on the front of the torso, typically around the waist. Extensive gear can result in limited range of motion for military personnel, complicating fast transitions into various firing positions as well as entering and exiting vehicles.

Generally, users are willing to carry additional equipment if it adds value, but will not wear equipment that interferes with their safety, mobility, or mission effectiveness. Also, users have indicated a preference for Velcro® fasteners over other fasteners such as ALICE clips or the straps associated with the MOLLE system. Further, there is a preference for a minimum number of wires, because wires can get caught on various protrusions, especially when entering and exiting vehicles. Further, military personnel want to be able to take off their helmets periodically, and therefore prefer to not be encumbered by any non-detachable head gear. Still further, military personnel do not want to be targeted as a specialized soldier (remote vehicle operator) and therefore value concealable components, particularly when the components are not muse.

Users of remote vehicles for detecting and disarming explosive devices require delicate control of grippers and arms of the remote vehicle to disarm explosive devices and gather evidence, but also require a certain amount of strength to maneuver explosive devices to a safe location.

There are a number of remote vehicles that may be deployed, depending on situational needs. Each remote vehicle may be capable of performing a number of missions and a variety of tasks. However, many elements of interacting with the various remote vehicles are common. It is therefore desirable to provide a common controller baseline that can be minimally modified to accommodate a variety of remote vehicles, missions, and tasks. The common baseline should be intuitive to a user and support dismounted (remote) operations.

Further, situational awareness must only be minimally compromised by the remote vehicle's control system.

SUMMARY

Accordingly, the present invention provides a control system for operation of a remote vehicle comprises a twin-grip hand-held controller having a volume of less than 1 liter and a weight of less than 1 lb. The twin-grip hand-held controller includes: a left grip shaped to be held between a user's left little finger, ring finger, and the ball of the thumb, leaving the user's left index finger, middle finger, and thumb free; a left control zone adjacent to the left grip, including a first analog joystick and a first 4-way directional control manipulable by the left thumb, and a left rocker control located on a shoulder portion of the controller; a right handed
grip shaped to be held between the user's right little finger, ring finger, and the ball of the thumb, leaving the user's left index finger, middle finger, and thumb free; a right control zone adjacent the right grip, including a second analog joystick and a second 4-way directional control manipulable by the right thumb, and a right rocker control located on a shoulder portion of the controller; a tether zone between the left control zone and the right control zone, including a tether anchor configured to tether the hand controller between the left grip and the right grip and to permit the hand controller to hang with the left grip and right grip pointing upward; a tether extending from the tether anchor to the right shoulder of an operator, the tether including a strain relief section; and a quick-release pad to be worn on an operator's chest, the quick-release pad including a first fastener for affixing the quick-release pad to available mounts on the operator, and a second quick-release fastener for holding the hand-held controller to the quick-release pad to be readily removable by pulling on the hand-held controller.

The present invention additionally provides a control system for operation of remote vehicle having a main drive and a flipper drive articulated in a pitch plane. The control system comprises a processor capable of communicating with the remote vehicle and a twin-grip handheld controller for providing commands to the processor. The twin-grip hand-held controller includes: a left grip that permits a user's left index finger, left middle finger, and left thumb to operate controls; a driving joystick for forward/reverse and left/right steering of the remote vehicle, and a first array of buttons, the driving joystick and the first array of buttons being manipulable by the user's left thumb; a camera joystick for controlling a camera pose of the remote vehicle, and a second array of buttons, the camera joystick and the second array of buttons being manipulable by the user's right thumb; a rocker control for controlling a flipper of the remote vehicle, the rocker control being aligned along a pitch plane parallel to the articulated flipper drive, and controlling a rotational position of a flipper drive; and a brake control that actuates a brake on the remote vehicle.

The brake control may be adjacent to the driving joystick and manipulable by the user's left thumb, or it may be a dead man's switch located under the user's left forefinger, left middle finger, right forefinger, or right middle finger.

One of the first array of buttons and the second array of buttons may include a speed governor that sets speed ranges for the remote vehicle and/or a button that selects among predetermined poses for the robot.

The twin-grip hand-held controller may alternatively include: a left grip that permits a user's left index finger, left middle finger, and left thumb to operate controls; a driving joystick for forward/reverse and left/right steering of the remote vehicle, and a first array of buttons, the driving joystick and the first array of buttons being manipulable by the user's left thumb; a camera joystick for controlling a camera pose of the remote vehicle, and a second array of buttons, the camera joystick and the second array of buttons being manipulable by the user's right thumb; and a mode button or toggle located under the user's left forefinger, right forefinger, left middle finger, or right middle finger.

The twin-grip hand-held controller may alternatively include: a left grip that permits a user's left index finger, left middle finger, and left thumb to operate controls; a driving joystick for forward/reverse and left/right steering of the remote vehicle, and a first array of buttons, the driving joystick and the first array of buttons being manipulable by the user's left thumb; a camera joystick for controlling a camera pose of the remote vehicle, and a second array of buttons, the camera joystick and the second array of buttons being manipulable by the user's right thumb; and one of a directional pad or a right button array for selecting among one or more predetermined poses of the remote vehicle.

The predetermined poses may include predefined positions of the remote vehicle's flippers and camera or of the remote vehicle's flippers, head and neck. Selection of a predetermined poses may be made with the user's right thumb. A user interface may illustrate the predetermined poses available for selection, and software may be included for transitioning among the predetermined poses. The software for transitioning among the predetermined poses may transition the remote vehicle through arbitrary intermediate poses.

The twin-grip hand-held controller may alternatively include: a left grip that permits a user's left index finger, left middle finger, and left thumb to operate controls; a driving joystick for forward/reverse and left/right steering of the remote vehicle, and a first array of buttons, the driving joystick and the first array of buttons being manipulable by the user's left thumb; a camera joystick for controlling a camera pose of the remote vehicle, and a second array of buttons, the camera joystick and the second array of buttons being manipulable by the user's right thumb; and one of a directional pad or a right button array for selecting among one or more autonomous assist behaviors of the remote vehicle.

The autonomous assist behaviors may include at least one of ballistic behaviors and continuous behaviors. The autonomous assist behaviors may include predefined positions of the remote vehicle's flippers and camera or predefined positions of the remote vehicle's flippers, head, and neck. Selection of an autonomous assist behavior may be made with the user's right thumb. A user interface may illustrate the autonomous assist behaviors available for selection, and software may be included for controlling the autonomous assist behaviors.

The present invention still further provides a system for controlling a remote vehicle. The system comprises a hand-held controller having a plurality of buttons; a display including a graphical user interface having soft buttons; and a processor in communication with the handheld controller and the display. Buttons of the hand-held controller are mapped to soft buttons of the graphical user interface to allow actuation of soft buttons of the graphical user interface. The hand-held controller is capable of switching between two or more button function modes, wherein each button function mode assigns different functions to one or more of the buttons of the hand-held controller.

The soft buttons of the graphical user interface may allow selection of one or more autonomous assist behaviors of the remote vehicle. The autonomous assist behaviors may include predetermined poses that may be one or more of ballistic and continuous.

The display may be a head-mounted display and the buttons on the directional pad of the hand-held controller may be mapped to the soft buttons of the graphical user interface. The details of one or more implementations of the disclosure are set forth in the accompanying drawings and the description below. Other aspects, features, and advantages will be apparent from the description and drawings, and from the claims.

DESCRIPTION OF DRAWINGS

FIG. 5; is a front sectional view of an embodiment of a roller wheel for use with the control system of the present invention;

FIG. 6 is a side view of the roller wheel embodiment of FIG. 5;

FIGS. 20A and 20B illustrate a remote vehicle responding to new heading commands to change direction in accordance with cruise control autonomous assist behavior activated using the control system of the present invention;

FIGS. 24A-24D illustrate an embodiment of an interaction between a cruise control autonomous assist behavior and an obstacle avoidance autonomous assist behavior.

Like reference symbols in the various drawings indicate like elements.

DETAILED DESCRIPTION

Figure 1:
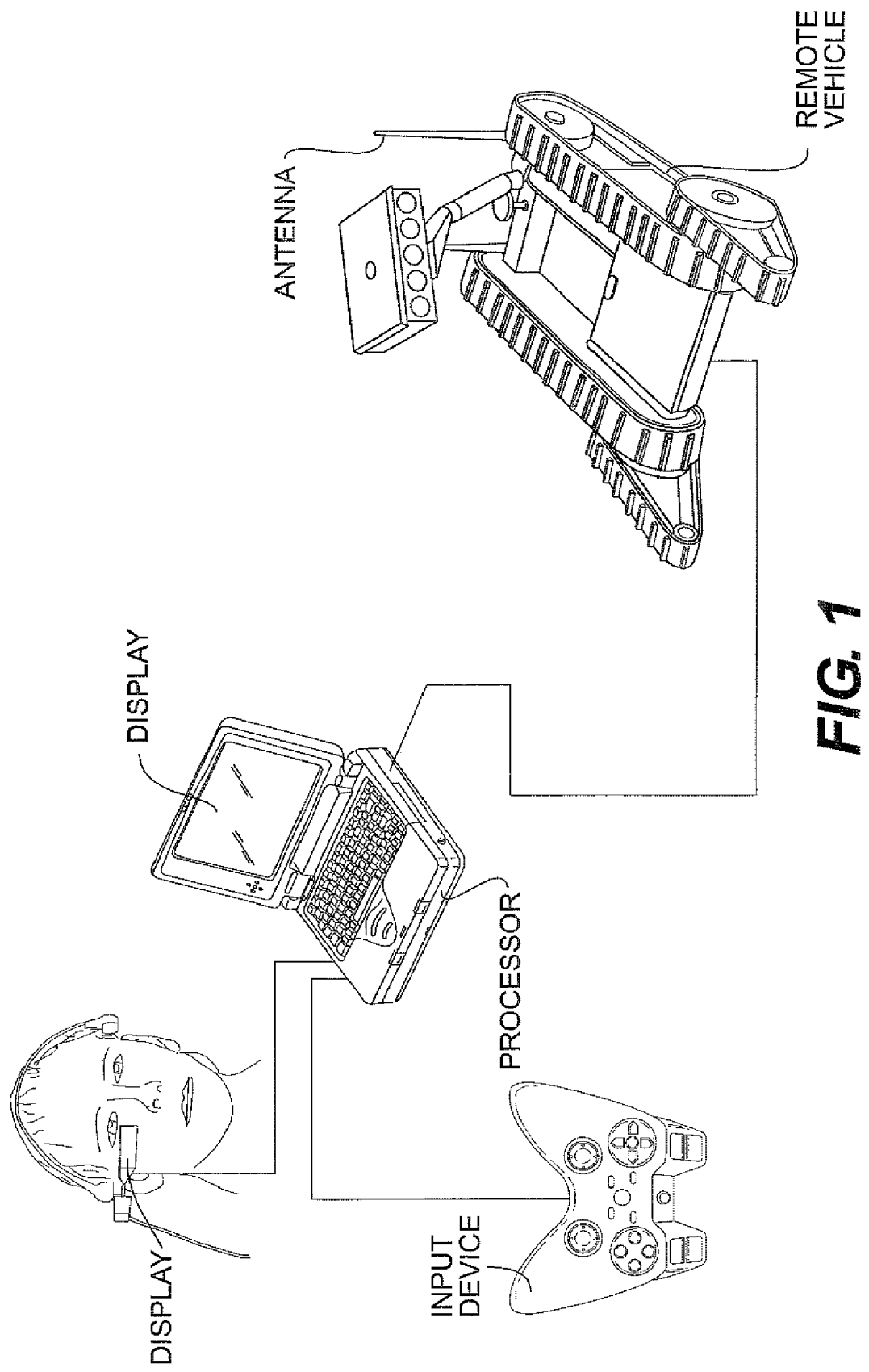
FIG. 1 illustrates an embodiment of a control system of the present invention and a remote vehicle.

A control system of the present invention includes an unobtrusive, highly mobile control system that provides the user with a remote vehicle such as a teleoperated remote control vehicle (embodied herein by a robot) operating experience that seamlessly integrates with the user's other tasks and duties. Situational awareness is minimally compromised when operating the system, as it is critical for the user to be aware of his surroundings. Basic components of the control system, which are illustrated in FIG. 1, include a display, an input device, a processor, an antenna/radio (for wireless communication), and software. In an embodiment of the invention, a head-mounted display provides video display from one or more remote vehicle cameras. A handheld controller, preferably having a twin-grip design, includes controls to drive, manipulate, and monitor the robot and its payloads. Audio may additionally be provided via the hand-held controller, the display, or dedicated listening devices such as, for example, Bluetooth headsets commonly used with mobile phones. In an embodiment of the invention, a microphone is provided on the hand-held controller, the processor, the display, or separately from these components, and can be used with a speaker on the remote vehicle to broadcast messages. A button on the hand-held controller or a soft button within the GUI can be used to activate the speaker and microphone for broadcasting a message.

The system is preferably compatible with MOLLE packs, ALICE packs, ILBEs, or OTVs commonly worn by users. The system preferably has the following additional characteristics: lightweight (e.g., no more than 7 pounds total, and no more than 2 pounds for the hand-held controller); mobile; small form factor (e.g., able to integrate with existing user gear); wearable or capable of being carried in a backpack; easy to put on/take off; adequate computer processing power; minimal or no external cables; meets mission time thresholds (e.g., 5 hours); rugged to intended environment (e.g., temperature, shock, vibration, water, etc.); able to withstand being dropped (e.g., 3 feet).

The platform should have standard interfaces for networking, display, wireless communication, etc.

The control system, as illustrated in FIG. 1, includes a processor such as a rugged laptop computer. The processor could alternatively be any suitably powerful processor including, for example, a tablet PC. The processor communicates with the remote vehicle wirelessly or via a tether (e.g., a fiber optic cable). Although wireless communication may be preferable in some situations of remote vehicle use, potential for jamming and blocking wireless communications makes it preferable that the control system be adaptable to different communications solutions, in some cases determined by the end user at the time of use. A variety of radio frequencies (e.g., 802.11), optical fiber, and other types of tether may be used to provide communication between the processor and the remote vehicle.

The processor must additionally communicate with the hand-held controller and the display. In a preferred embodiment of the invention, the processor is capable of communicating with the hand-held controller and the display, illustrated in the present embodiment to be a head-mounted display, either wirelessly or using a tether. To facilitate wireless communication among the various elements of the system, the processor includes a radio and an antenna.

In addition, the processor includes software capable of facilitating communication among the system elements, and controlling the remote vehicle. In an embodiment of the invention, the software is a proprietary software and architecture, including a behavioral system and common OCU software, which provide a collection of software frameworks that are integrated to form a basis for robotics development. According to an embodiment of the invention, this software is built on a collection of base tools and the component framework, which provide a common foundation of domain-independent APIs and methods for creating interfaces, building encapsulated, reusable software components, process/module communications, execution monitoring, debugging, dynamic configuration and reconfiguration as well as operating system insulation and other low-level software foundations like instrument models, widget libraries, and networking code. In an embodiment of the invention, the processor performs all of the data processing for the control system.

Figure 2:
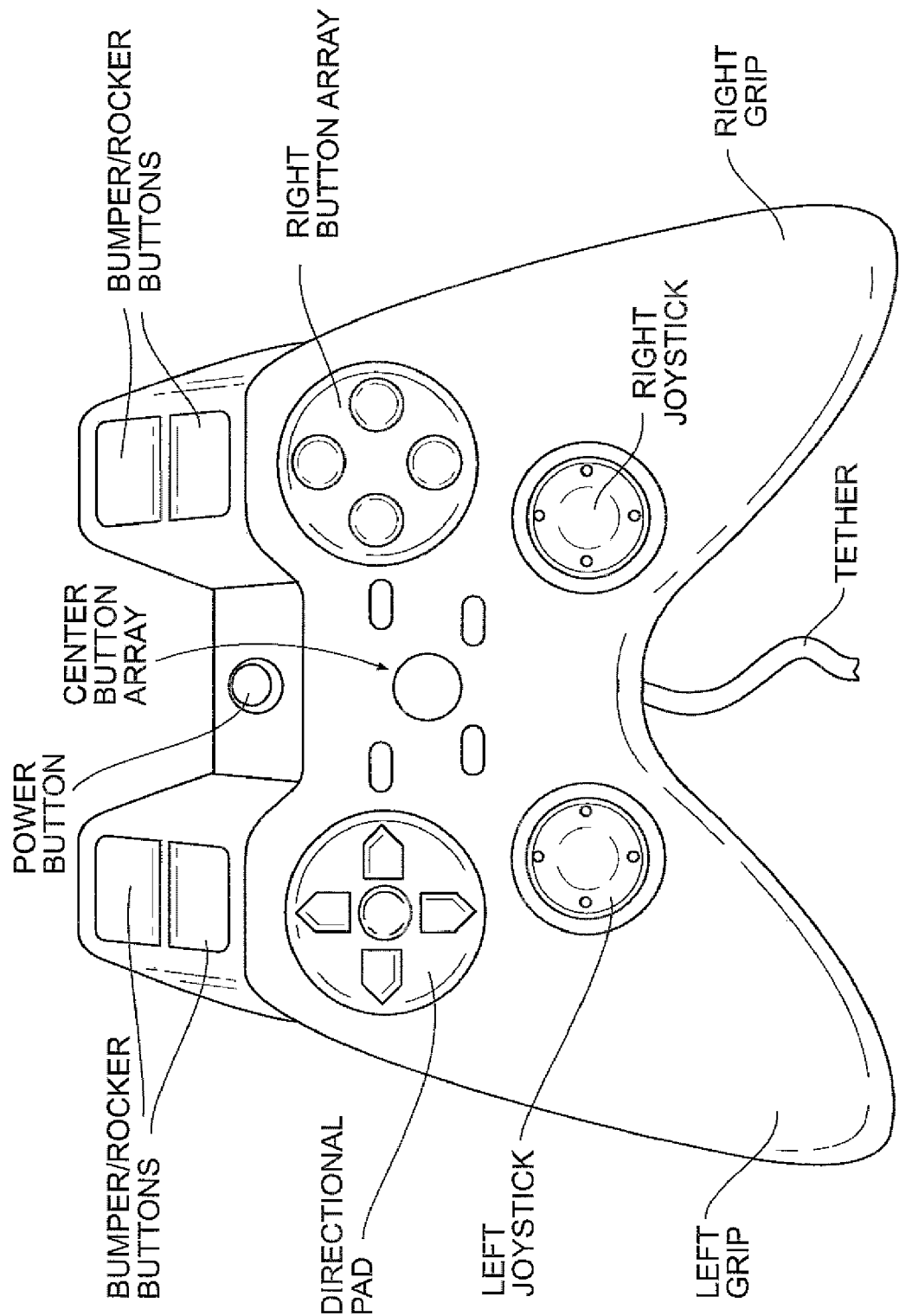
FIG. 2 is a top view of an embodiment of a hand-held controller of the control system of the present invention.

Referring to FIG. 2, an exemplary embodiment of a twin-grip hand-held controller is illustrated. The hand-held controller includes left and right grips shaped to be held between a little finger, a ring finger, and the ball of a thumb of a respective hand, leaving the index finger, middle finger, and thumb of the respective hand free to manipulate controls. Two joysticks (analog, having 4 degrees of freedom) are provided on the left and right sides of the hand-held controller. The joysticks may be 2-axis analog. In an embodiment of the invention, analog-to-digital resolution of the joysticks is at least 12-bit per axis with the joystick center "dead band" (maximum offset from center on spring return) being less than about 3% of total resolution. If pressed, the joysticks can function as digital buttons. The present invention also contemplates using pucks (6 degrees of freedom) instead of joysticks.

In an embodiment of the invention, the left joystick is commonly used to drive the remote vehicle (forward, backward, left, and right). The right joystick controls one or more other functions of the robot depending on a selected button function mode, including a camera (e.g., the attack camera), a weapon, or flipper control.

A directional pad is located on a left side of the hand-held controller and includes an array of four or five discrete digital buttons for manipulation by the user's left thumb. The buttons are arranged in a diamond shape with an optional button in the center. The four buttons not in the center preferably come to a rounded point at one end to indicate direction. One button points up, one points down, one points right, one points left. In an embodiment, the four buttons not in the center have a generally flat exposed surface and the center button has a generally hemispherical exposed surface and is raised above the surrounding buttons. In an embodiment of the invention, the directional pad is used to navigate among the soft buttons of a GUI displayed by the head-mounted display. The center button of the array, when present, may be used to select a soft button of the GUI.

A right button array includes an array of four discrete digital buttons for manipulation by the user's right thumb. The buttons are arranged in a diamond shape and are circular with exposed surfaces that may be at least slightly curved. The right button array can be used to control a variety of functions such as camera selection, robot light setting, and robot speed. When no center button is provided on the directional pad, one of the buttons of the right button array may be used to select a soft button of the GUI.

A center button array is shown to include five discrete digital buttons for manipulation by the user's thumbs. A first button is generally located in an upper left region of the center area, a second button is generally located in an upper right region of the center area, a third button is generally located in a lower left region of the center area, a fourth button is generally located in a lower right region of the center area, and a fifth button is generally located in the center of the other buttons. The first four buttons are elongated (generally rectangular) and the fifth button is generally hemispherical. In an embodiment of the invention, the center button is larger than the other buttons in the center array.

In an embodiment of the invention, the upper right button (second) button is the menu button, which brings up a menu within the GUI displayed by the head-mounted display. The menu is preferably a hierarchical menu, such as a drop-down menu, that allows the user to select a screen layout, a robot to control, select a safe mode for the robot (such as observe mode), manage and play video, audio and snap shot recordings, select among other settings such as brightness, and time/date, or review documentation regarding the controller or the robot. In this embodiment, the upper left (first) button acts as a pause or brake button for the robot, ceasing movement of the robot until released. To prevent accidental activation, the pause/brake button may be recessed and/or may require a minimum force for activation.

A button on the hand-held controller or a soft button within the QUI can be used to switch controllers, so that another hand-held controller or alternative control device can take over control of the remote vehicle. This can allow multiple operators to control the same remote vehicle.

The pause or brake button may alternatively be designed as a dead man's switch to ensure safe operation of the robot—if the user's finger is released from the switch, the robot ceases to operate. In an embodiment of the invention, the dead man's switch is located under the user's left index finger, right index finger, left middle finger, or right middle finger.

Bumper or rocker buttons are located on the shoulders of the hand-held controller, the buttons making up a rocker control. Two rocker buttons make up a first rocker control on the left shoulder and are oriented vertically, and two more rocker buttons make up a second rocker control on the right shoulder and are also oriented vertically. As an alternative to rocker buttons, one-axis switches may be provided on the left and right shoulders (not shown). The rocker buttons, being aligned vertically along the shoulder of the hand-held controller, are thereby located in a pitch plane parallel to the articulated flipper drive. In an embodiment of the inventions, the rocker control on the right shoulder is used for flipper control.

The directional pad, left joystick, and left shoulder rocker control make up a left control zone. The right button array, right joystick, and right shoulder rocker control make up a right control zone.

A power button is located between the left and right shoulder areas of the hand-held controller. In the illustrated embodiment, the button is circular with a flat protruding surface. The button may optionally be recessed (to prevent inadvertent actuation) and/or backlit with an LED that indicates the state of the hand-held controller (i.e., on or off). In an embodiment of the invention, the area of the hand-held controller immediately surrounding the power button is smooth to facilitate using electrical tape to cover the power button and its LED as needed. Covering the power button can avoid detection of the hand-held controller. The power button on the hand-held controller may control the state of just the hand-held controller, or of a number of other system components, such as the processor and one or more displays (e.g., the head-mounted display).

Figure 3:
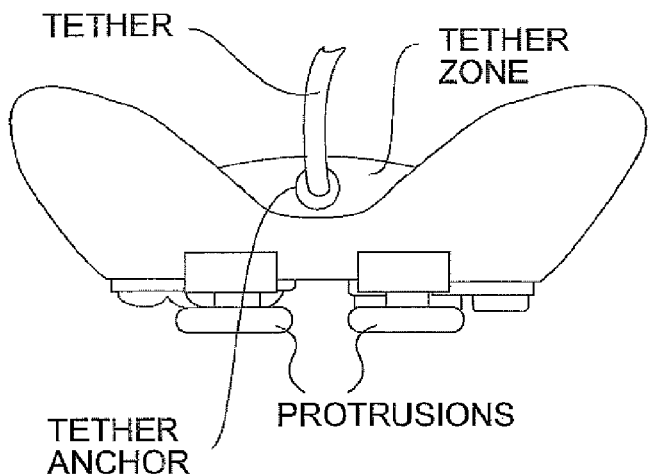
FIG. 3 is a rear view of the embodiment of FIG. 2.

An embodiment of the invention includes a tether zone (see FIG. 3) located between the left control zone and the right control zone, which includes a tether anchor configured to tether the hand-held controller between the left grip and right grip and permit the hand-held controller to hang in use (see FIG. 13) with the left grip and right grip pointing upward. A tether, or cord, extends from the tether anchor, preferably to the right shoulder of a dismounted operator. In an embodiment of the invention, the tether is detachable from the hand-held controller, and connects the hand-held controller to the processor for non-wireless communication between the two. In an embodiment of the invention, the hand-held controller can operate on battery power and communicates wirelessly with the processor, but has the ability to accept a tether when non-wireless connection is preferred.

In an embodiment of the invention, the tether has a strain relief allowing it to be flexible but also physically support the weight of the hand-held controller and withstand being dropped the a distance equal to the tether's length (e.g., 3 feet) without damage or disconnection.

In an embodiment of the invention, the tether attaches to the hand-held controller via an environmentally sealed connector, such as push-pull, screw latching, etc. The same environmentally sealed connection may be used where the tether connects to the processor. The tether connectors may be keyed to prevent pin misalignment during connection.

FIGS. 5 and 6 illustrate an optional roller wheel that may be provided on the hand-held controller. In an exemplary embodiment, the roller wheel is surrounded by a textured tire and sits in a cavity of the hand-held controller. The cavity is formed in the exterior surface of the hand-held controller and includes an interior shell to encase the roller wheel. An axle extends between two sides of the interior shell and allows the roller wheel to rotate within the cavity. Bushings may additionally be provided to reduce friction and wear. The axle extends into a rotary transducer located on at least one side of the cavity, the rotary transducer measuring rotation of the roller wheel and converting it to a digital output. The location of the roller wheel on the hand-held controller, if provided, may vary, although the wheel is preferable located so that it can be actuated by the user's thumb or forefinger (either left or right). The roller wheel may be used, for example, for camera zoom or to scroll among soft buttons in the GUI.

Figure 7:
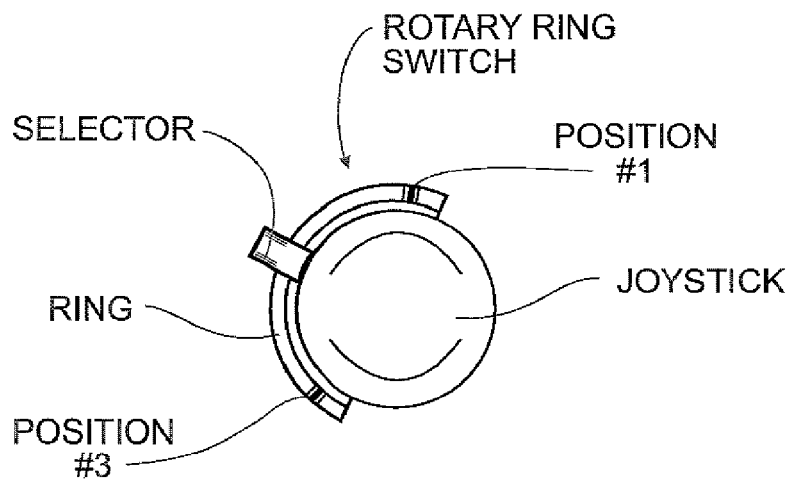
FIG. 7 is a top view of an embodiment of a rotary ring switch for use with the control system of the present invention.
Figure 8:
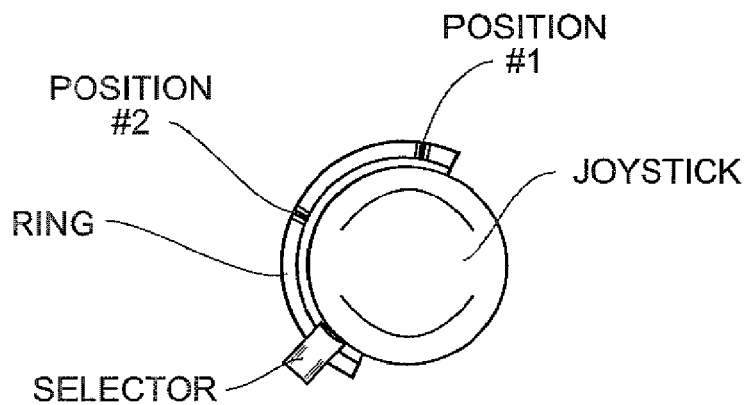
FIG. 8 is another top view of the rotary ring switch embodiment of FIG. 7.
Figure 9:
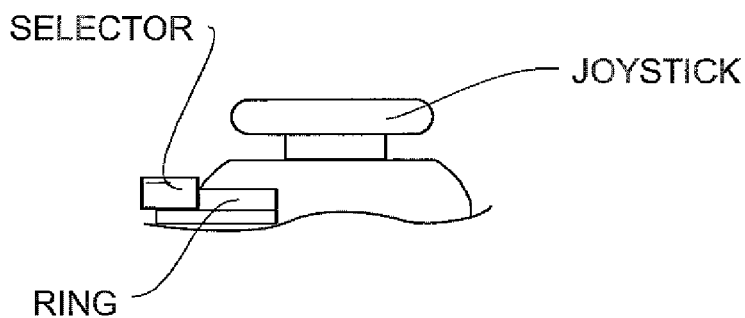
FIG. 9 is a side view of the rotary ring switch embodiment of FIG. 7.

FIGS. 7, 8, and 9 illustrate an optional rotary ring switch. In the illustrated exemplary embodiment, the rotary ring switch is located around a joystick and includes three positions on the ring that may be selected by sliding a selector along the ring to one of the positions. In an embodiment of the invention, the rotary ring switch surrounds the left joystick so that selection is made with the user's left thumb. The rotary ring switch may be used to select among button functions modes.

The present invention contemplates a variety of locations for the ring switch if one is provided, as well as a varying number of positions for selection. For example, the ring switch could surround the right joystick, the directional pad, the right button array, or the center button array.

The present invention contemplates using labels (not shown) on or near the buttons of the hand-held controller to indicate the functionality of one or more of the buttons.

It will be appreciated by those skilled in the art that location and shape of the buttons may vary among embodiments of the invention. The present invention contemplates a variety of button shapes and locations. Additional buttons may be added, or buttons may be removed within the scope and spirit of the invention.

The present invention contemplates additional or alternative functionality for the hand-held controller. For example, the hand-held controller may be able to detect aspects of its own movement via accelerometers and gyroscopes and translate that movement into remote vehicle control functions such as, for example, scrolling through a GUI menu. While the hand-held controller's movement could be translated into corresponding movement of the remote vehicle, such control may not be advisable in certain situations where precise control of the remote vehicle is critical and/or the controller may be subject to unforeseen jostling with potentially hazardous results in terms of corresponding movement of the remote vehicle.

An embodiment of the invention provides mode changing software for changing button mapping of the hand-held controller between, for example, driving a robot, manipulating an arm, controlling a camera, etc.

In an embodiment of the invention, switching among button function modes of the handheld controller is accomplished by actuating a button or toggle-type switch, preferably using the operator's index finger(s). This can be accomplished using an above-described rotary ring switch, another button on the hand-held controller, or even the optional roller wheel described above. The present invention also contemplates switching button function modes on the left side of the controller which one switch or button, preferably located on the left side, and switching button function modes on the right side of the controller which another switch or button, preferably located on the right side.

According to an embodiment of the invention, button function modes include:

Drive Mode—the left joystick is used to steer the robot forward, back, left, and right, the left button array is used to control the attack camera (for a robot having, for example, a drive camera and an attack camera), the right joystick controls a spooler (for example containing fiber optic cable), the right button array controls a variety of functions such as the camera zoom, robot lights, robot speed, an camera choice (allows user to choose one or more cameras as, for example, primary and secondary), and the right shoulder is for flipper control.

Manipulate (Gripper) Mode—the left joystick is used to move the gripper forward, back, left, and right, the right joystick is used to move the gripper up and down and to fold or unfold the elbow, and the right shoulder buttons are used to rotate the gripper clockwise and counterclockwise.

Target (Attack Camera) Mode—The left joystick is used to move the attack camera forward, back, left, and right, and the right joystick is used to move the attack camera up and down.

Joint Mode—The left joystick folds and unfolds the gripper shoulder (e.g., using the top and bottom buttons), and rotates the turret clockwise and counterclockwise (e.g., using the right and left buttons). The right joystick folds and unfolds two gripper elbows. The left button array controls the attack camera, and the right button array controls a variety of functions such as the camera zoom, robot lights, robot speed, and camera choice. The right shoulder buttons are used to rotate the gripper clockwise and counterclockwise.

Menu (GUI Navigation) Mode—The left joystick navigates a cursor up, down, right, and left, the left button array moves the menu itself up, down, left, and right, and the right button array includes cancel and select functions.

Among the above exemplary button function modes, certain buttons may maintain the same functions, such as the top left button of the center button array being a pause/brake button, and the top right button of the center button array being a menu button. In addition, the button to change among the above functional modes may remain the same. In an embodiment of the invention, the left joystick is always used to drive the remote vehicle and the directional pad is always used to navigate soft buttons of the GUI. It is the other buttons that change functionality among modes.

It should be understood that the present invention contemplates a variety of button mapping scenarios, and a variety of single and combined function modes that allow the operator to control one, two, or more payloads of the remote vehicle with the same hand-held device by manipulating the buttons on the hand-held controller.

In an embodiment of the invention, the weight of the hand-held controller, including the cord, is less than or equal to two pounds. In a preferred embodiment, the weight of the hand-held controller itself is less than one pound, and the dimensions are no larger than 4.5"×2.5"×6.5".

According to an embodiment of the invention, the hand-held controller is ruggedized. For example, the casing and switch plate may comprise aluminum, and the unit or parts thereof may be coated in plastisol or another suitable coating. In addition, the tether connection may be environmentally sealed, and the buttons may additionally be made waterproof as is known to those skilled in the art, particularly in the area of waterproof cameras.

Figure 4:
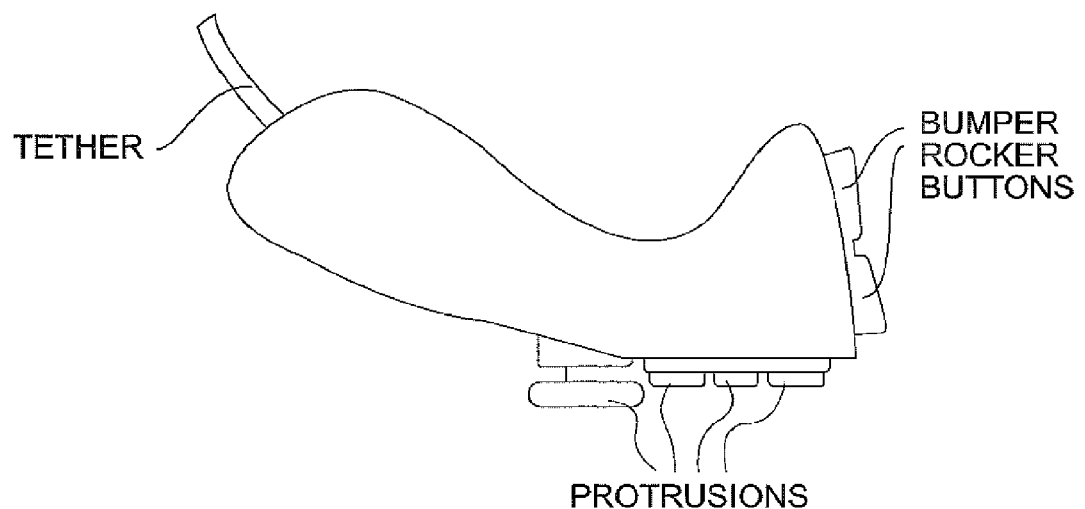
FIG. 4 is a side view of the embodiment of FIG. 2.
Figure 10:
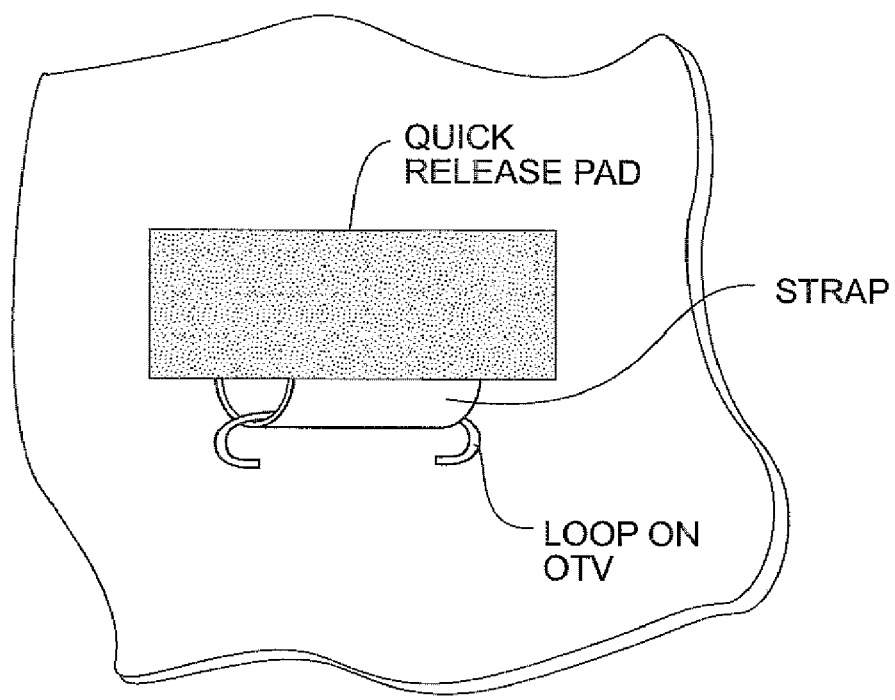
FIG. 10 illustrates an embodiment of a quick-release pad of the control system of the present invention.

For adhering the hand-held controller to the user's gear, an embodiment of the invention includes a quick-release system. An embodiment of the quick-release system includes a quick release pad, an embodiment of which is illustrated in FIG. 10. The quick-release pad preferably comprises Velcro® on an outer-facing side thereof, and has a size suitable to allow releasable but stable attachment of the hand-held controller to the pad. The pad is attached to a loop on the user's gear. In the embodiment of FIG. 10, the loop is a horizontal loop such as those provided on an OTV. A strap connected to the quick-release pad circles through the OTV loop to attach the quick-release pad to the OTV. An additional quick-release mechanism (not shown) may be used to releasably fasten the tether (which connects the hand-held controller to the processor) to the user's gear. Complementary material is located on an underside the hand-held controller to mate with the quick-release pad. In an embodiment of the hand-held controller including protrusions extending from a bottom thereof (see FIGS. 3 and 4), the complementary material is located on the protrusions. In an alternate embodiment with, for example, a flat bottom, at least a portion of the bottom would include complementary material. Because Velcro® can wear out and become less effective, the present invention contemplates the Velcro in the quick-release system being easily replaceable.

The head-mounted display illustrated in FIG. 1 generally indicates a display device worn on a user's head or as part of a helmet, which has a display optic in front of one or both eyes. A typical head-mounted display has one or two displays with lenses and semi-transparent mirrors embedded in a helmet, eye-glasses, or a visor. The display units are miniaturized and may include cathode-ray tubes (CRTs), liquid crystal display (LCD), Liquid Crystal on Silicon (LCos), or an organic light-emitting diode (OLED).

The head-mounted display allows the remote vehicle operator to see what the remote vehicle sees through one or more cameras, so that the remote vehicle can be controlled when it is not within the operator's line of sight, and also allows the operator to maintain situational awareness. In an embodiment of the invention, the head-mounted display is an Icuiti tactical display.

The head-mounted display displays a GUI with views from the robot's camera(s) and information about the robot such as battery life, payloads, communication status, etc., and also displays soft buttons that are mapped to the hand-held controller buttons and allow the user to more intuitively control the robot using the hand-held controller.

The present invention contemplates using one or more head-mounted displays with a single control system. In addition, the video stream from the robot camera(s) can be multicasted for use by multiple clients. Indeed, the multiple clients need not only be multiple head-mounted displays, but may alternatively or additionally include a variety of displays and/or recording devices in a variety of locations.

The head-mounted display is preferably capable of either wireless or tethered communication with the hand-held controller through the processor.

As stated above, a menu mode of the hand-held controller allows the user to navigate among soft buttons or icons displayed by the head-mounted display. Exemplary embodiments of the GUI display are illustrated in FIGS. 11 and 12.

Figure 11:
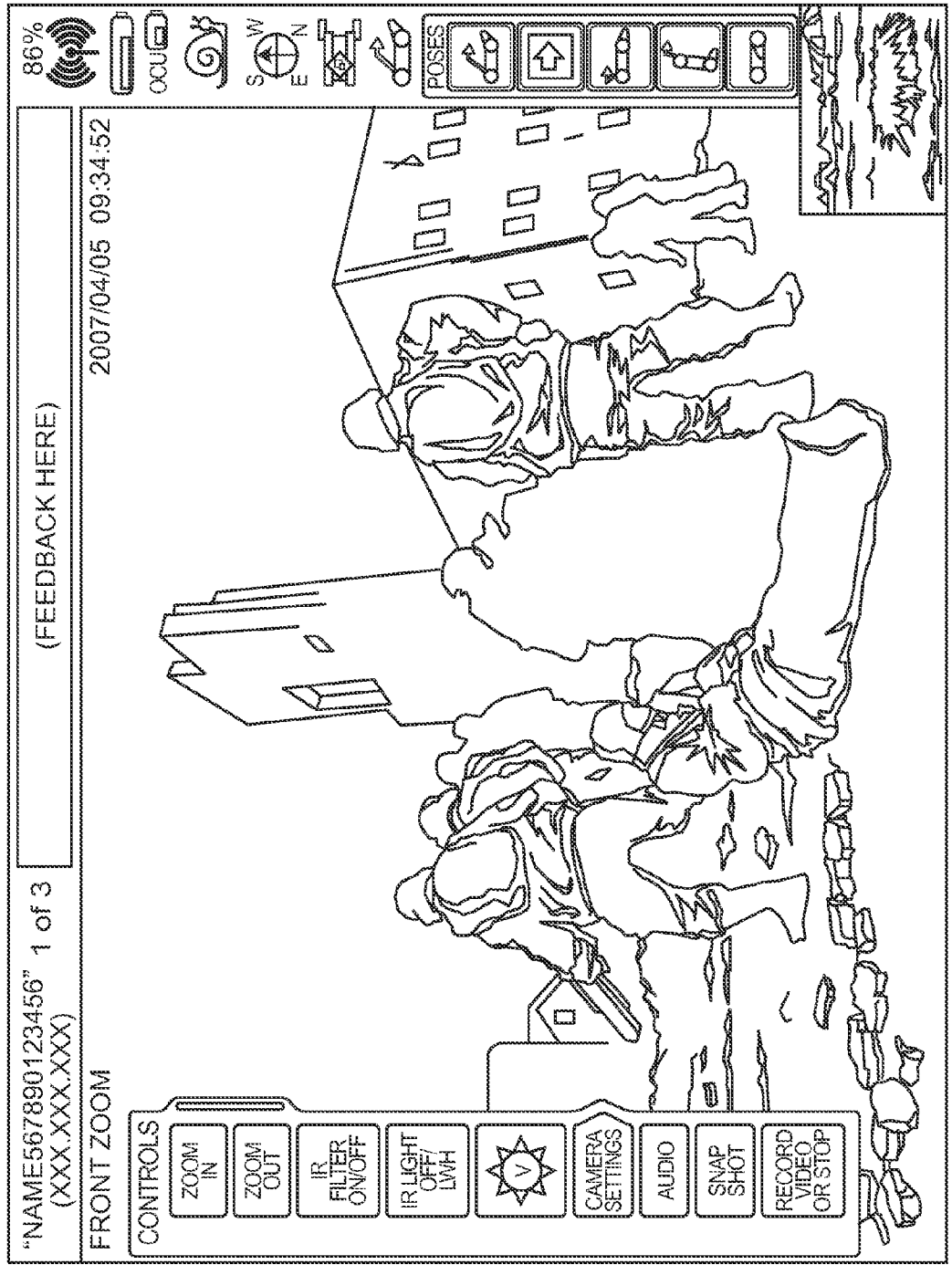
FIG. 11 is another embodiment of a user interface of the control system of the present invention.
Figure 12:
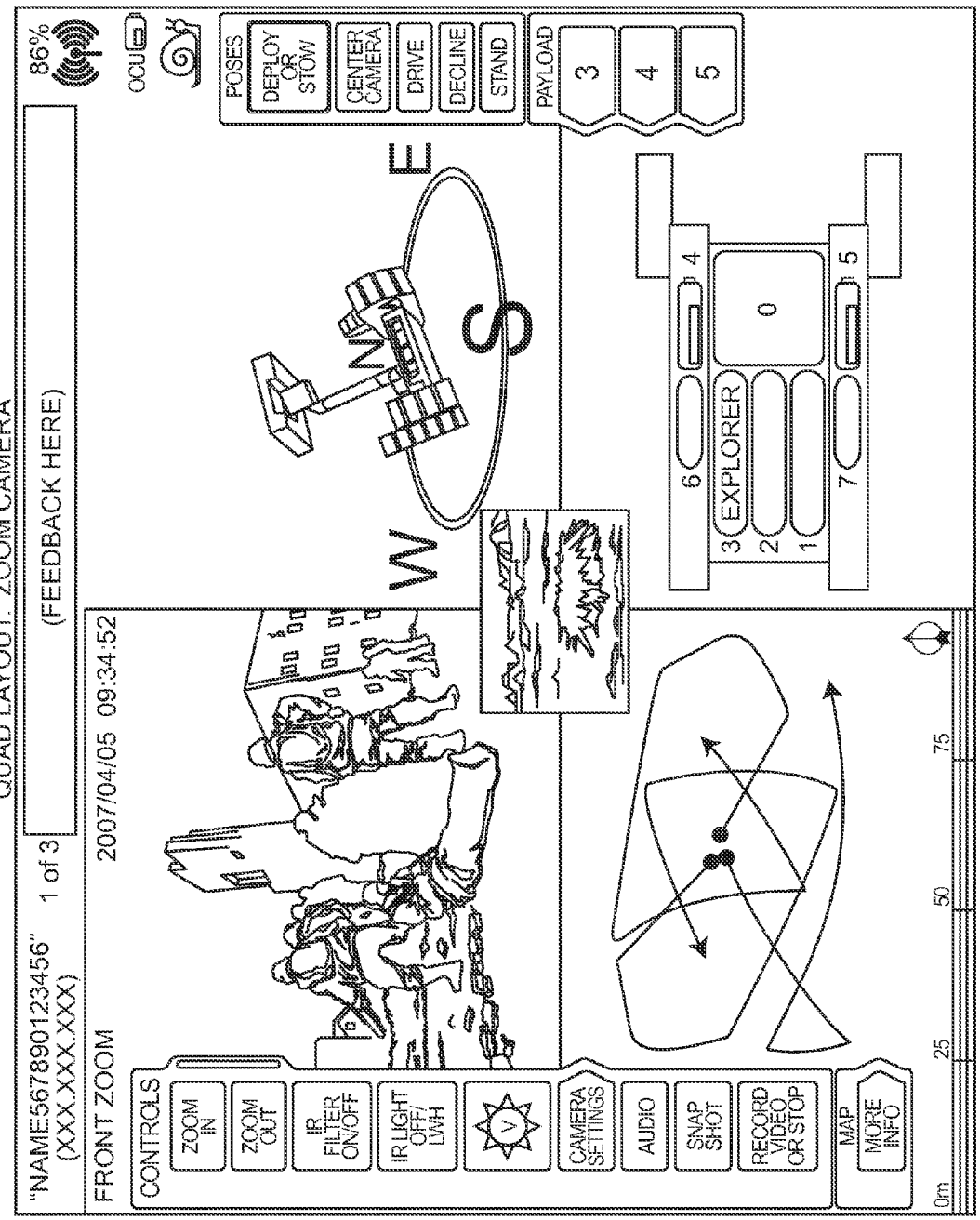
FIG. 12 is an embodiment of a user interface of the control system of the present invention.

As illustrated in the embodiment FIG. 11, the head-mounted display provides the user with a variety of information in what is indicated as a "max camera" layout. In this illustrated embodiment, the main image is a video stream from the robot's attack camera and the smaller image in the lower right corner is video stream from the robot's drive camera. As an alternative to video streams, a series of snapshots can be displayed at predetermined time intervals. The status of the attack camera (e.g., front zoom) is displayed in the upper left corner, and certain camera control icons or soft buttons are presented under the camera status. In this embodiment, the icons include zoom in, zoom out, IR filter on/off, IR light off/low/medium/high, camera default position (designated in this embodiment as a V in a sun shape), camera setting choices, audio choices, snap shot, and video record on/off. In this embodiment, upon choosing (by pressing the soft button or icon by manipulating the hand-held controller in the menu mode) camera settings and audio, the GUI pops up a screen to select among a variety of setting options. In an embodiment of the invention, the icons can be minimized. Above the status of the camera, the robot's name can be displayed (illustrated herein as "Name567890123456."

The camera may be returned to its default position, or otherwise controlled, via the soft button mentioned above, or a button on the hand-held controller.

Additional icons or soft buttons may be displayed, for example on the right side of the head-mounted display view. In this embodiment, the icons or soft buttons include, from top to bottom, status of communication link (with robot), battery charge level (of the robot and the OCU), speed toggle (wherein the snail icon indicates that the robot is in a slow range of speed within the available scalable range of speed), robot heading, two icons indicating the robot's position and heading, and a variety of autonomous assist options such as predefined poses (described in detail below).

Another embodiment of the system's GUI, indicated as a "quad" layout, is illustrated in FIG. 12. The larger, upper left image is a video stream from the robot's attack camera and the smaller image in the center of the display is video stream from the robot's drive camera. As an alternative to video streams, a series of snapshots can be displayed at predetermined time intervals. The status of the attack camera (e.g., front zoom) is displayed in the upper left corner, and certain camera control icons or soft buttons are presented under the camera status, as set forth for the prior embodiment. In an embodiment of the invention, the icons can be minimized. Above the status of the camera, the robot's name can be displayed (illustrated herein as "Name567890123456." Under the camera controls is a map icon allowing the user to select additional information from the system's mapping function. To the right of the map icon and under the video stream from the attack camera, mapping information regarding one or more of the robot's prior mission movements can be displayed. Alternatively, the missions of a number of nearby robots are displayed.

Additional icons or soft buttons may be displayed, for example on the right side of the head-mounted display layout. Similar to the previous embodiment, the icons or soft buttons include, from top to bottom, status of the communication link (with robot), battery charge level (of OCU), speed toggle wherein the snail icon indicates that the robot is in a slow range of speed (within the available scalable range of speed), and a variety of autonomous assist options such as predefined poses. In this embodiment, the poses are indicated by name rather that a graphical representation of the pose itself. Payload icons under the pose icons allow the user to activate a payload or bring up a control menu for that payload. They can also display information regarding selected payloads. Possible payloads include cameras, chemical detection devices, sniper detection devices, cable spools, batteries, etc. In the illustrated embodiment, payload 3 is an Explorer extension added to the chassis of the robot, and payloads 4 and 5 are batteries.

To the right of the video stream from the robot's attack camera is a representation of the robot's position and heading, including any tilt. Under the positional representation is an identification of the payloads and information regarding the payloads, such as an indication of remaining battery life.

In accordance with the present invention, the user may choose among a variety of GUI layouts, such as the "max camera" and "quad" layouts described above.

In the above illustrative embodiments of the GUI, the icons or soft buttons may be displayed continuously for the user, who navigates among them using a dedicated set of buttons on the hand-held controller (e.g., the directional pad), or may be displayed only when the handheld controller is in a menu mode. Additional soft icons or buttons may be displayed as desirable. In an embodiment of the invention, the illustrated icons are displayed continuously for the user, and selection of a menu mode on the hand-held controller brings up an additional hierarchical menu of functions through which the user can navigate, for example, using the directional pad.

In an embodiment of the control system of the present invention, audio is provided on one or more of the processor, the hand-held controller, the head-mounted display, or a separate headset.

The control system of the present invention preferably has two states (on and off) and three modes: (1) training mode; (2) operation mode; and (3) maintenance mode. The modes of the control system are distinct from the button function modes of the hand-held controller. After being powered on, the system may default into an operation mode, default to the last mode selected, or may initially prompt the user to choose among the three modes. Most system functions, including the exemplary functions listed in the table below, are preferably performed in all three modes.

Power
On/off status
Communicate
Communicate with robot status of communications
Tethered and wireless communication
Control
drive/stop
brake engage/release speed control
flipper control head/neck control pose selection camera selection camera zoom
camera control options including aperture/exposure/resolution/black and
white/color/etc.
microphone control on/off/speak speaker control on/off/volume request information/status/data illumination on/off/other
select options
select robot payload control
map controls (autonomous robots or assistance)
autonomy controls
Display
display video
display health and status (system)
display options
GPS location/navigational information
Audio
emit send
adjustment options
Process
process/data/audio/video The system is intended for use by a dismounted operator, dismounted means that the operator is freely moving about outside of the remote vehicle(s). However, the system may additionally be used by an operator that is not dismounted. The system of the present invention may be useful to an operator that is not dismounted in an instance where the operator has difficulty reaching all of the controls needed to operate the vehicle and its payloads, or the vehicle and other remote vehicles.

The system of the present invention should be capable of controlling remote vehicle mobility, executing operator tasks with one or more remote vehicles, and supporting maintenance functions.

Figure 13:
FIG. 13 illustrates an exemplary hand-held controller.

FIG. 13 illustrates a soldier using the control system of the present invention to control a robot. Although the robot is illustrated to be in the soldier's line of sight, the present invention is directed to non-line-of-sight operation as well, with the solder using the head-mounted display to see what the robot sees and thereby effectively control the robot.

Figure 13A:
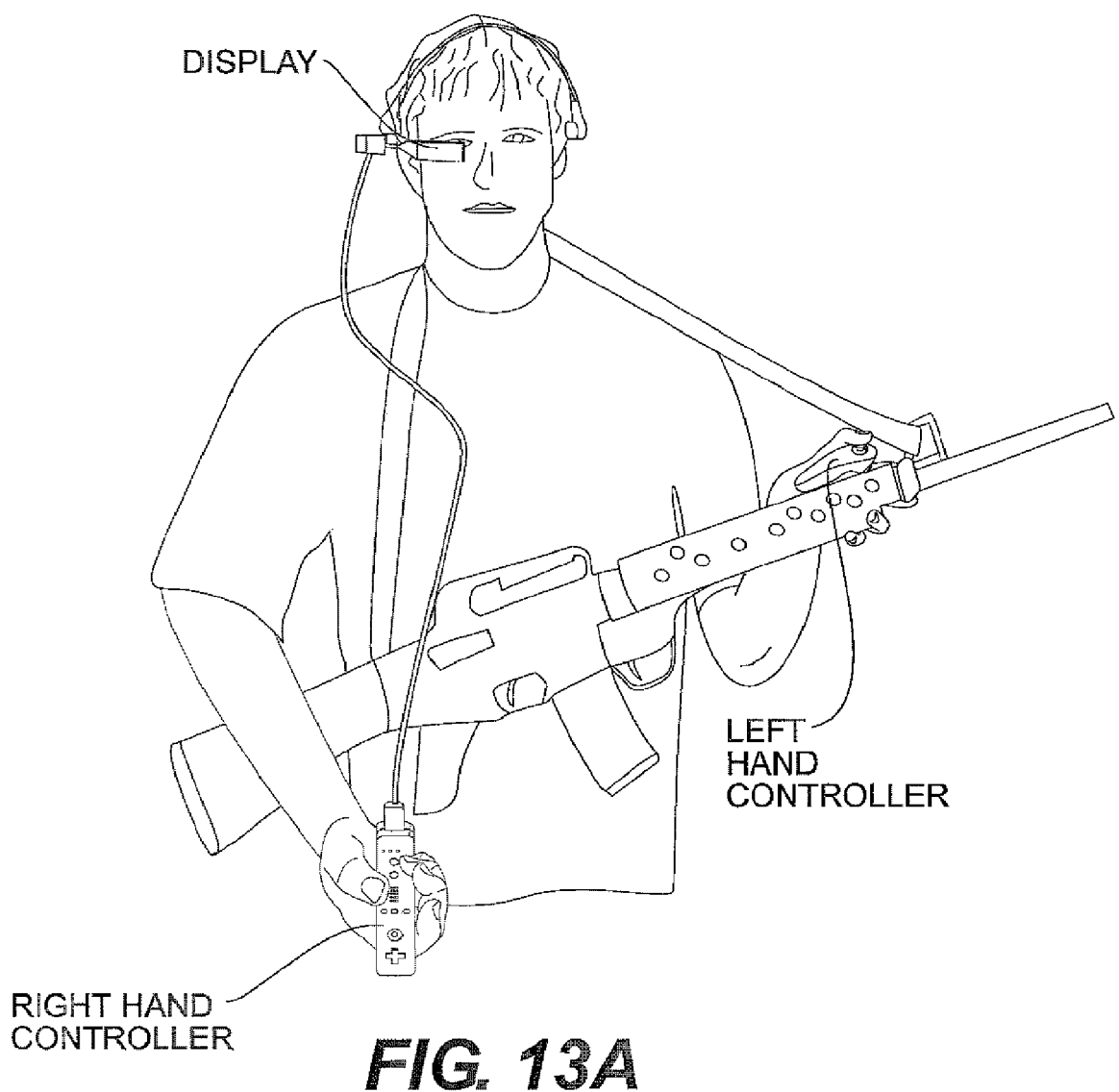
FIG. 13A illustrates an exemplary embodiment of the present teachings, including a two-piece hand-held controller.

FIG. 13A illustrates an embodiment of the invention including a two-piece hand-held controller that functions substantially similar to the one-piece hand-held controller described above. This embodiment of the invention allows the left portion of the controller to be attached to the user's gun, so that one hand can remain on the gun while controlling the remote vehicle.

Figure 13B:
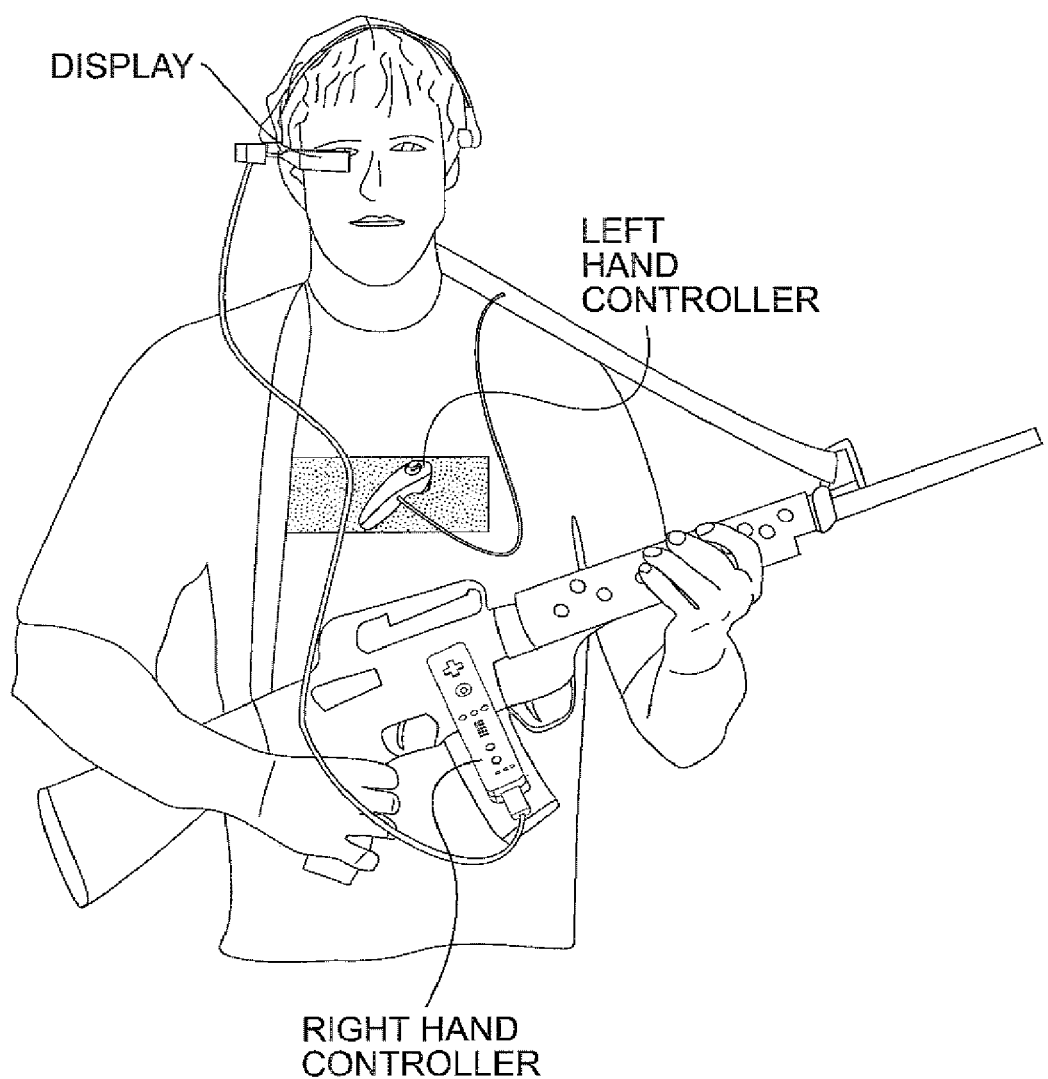
FIG. 13B illustrates the exemplary embodiment of FIG. 13A in use.
Figure 13C:
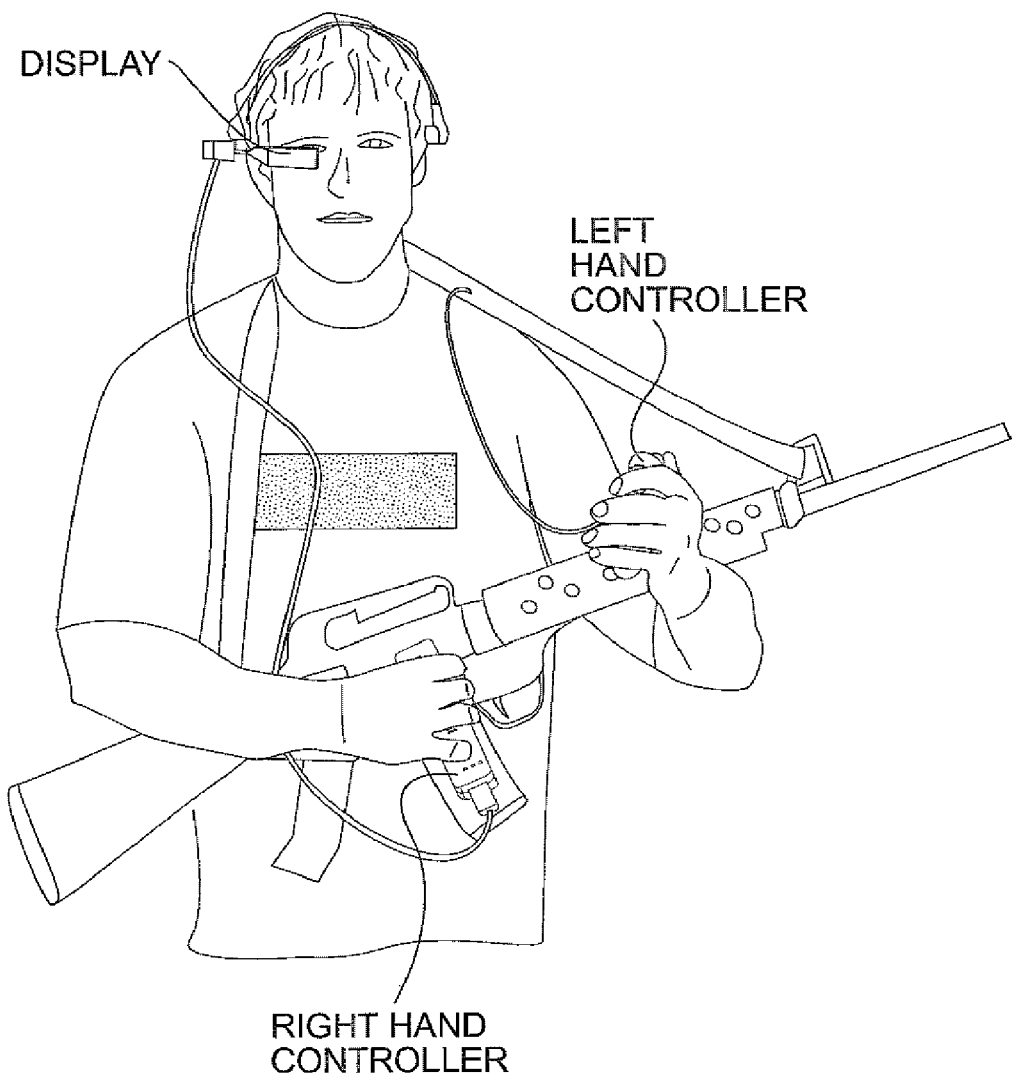
FIG. 13C illustrates the exemplary embodiment of FIG. 13A in use.

FIGS. 13B and 13C illustrate another embodiment of the invention including a two-piece hand-held controller. In this embodiment, the right hand controller is mounted to the gun and the left hand controller can be secured to a quick-release pad. The left hand controller would preferably hang from the user's left shoulder. This embodiment would be preferably where a user is trained to or tends to keep his firing hand on the gun.

The controller may have a variety of shapes and sizes to facilitate ease of gripping and actuation by a user. For example, the one or both pieces of the controller may include a grip portion shaped to be held between a little finger, a ring finger, and the ball of a thumb of a respective hand, leaving the index finger, middle finger, and thumb of the respective hand free to manipulate controls. One or both pieces of the controller may include a joystick to be manipulated by the user's thumb. The two-piece hand-held controller may include the same number of buttons as the one-piece controller above, or may include a more limited number of buttons.

In an embodiment of the two-piece hand-held controller, the two pieces may be mated to form a one-piece hand-held controller for use as described above. In this embodiment, the two pieces may look more like halves of the one-piece handheld controller illustrated in FIG. 2.

As in the prior disclosed embodiments, the hand-held controller communicates with the display via a processor (not shown).

Custom Robot Poses (as Represented by GUI Icons)

Figure 14:
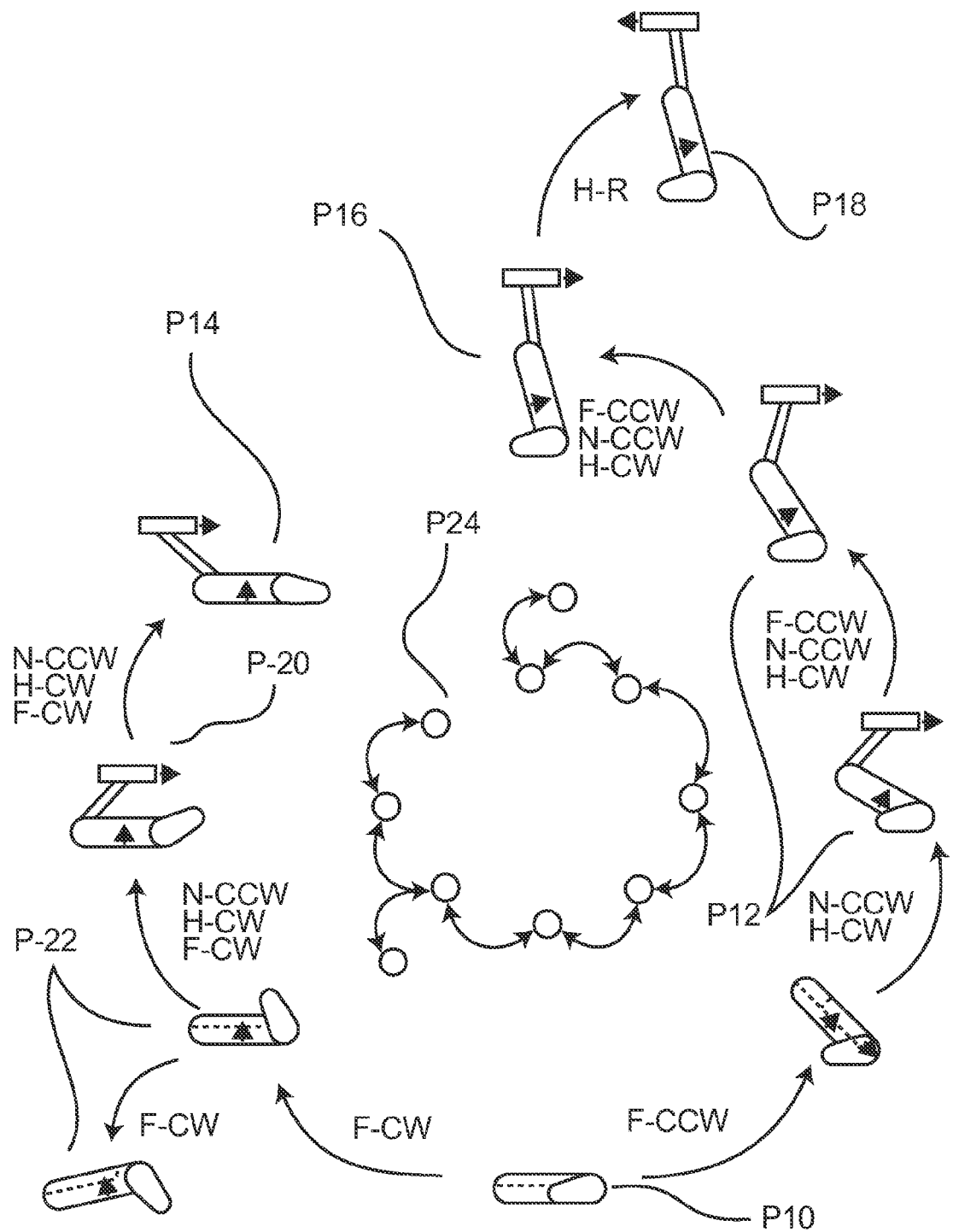
FIG. 14 illustrates an exemplary embodiment of custom robot poses activated using the control system of the present invention.
Figure 15:
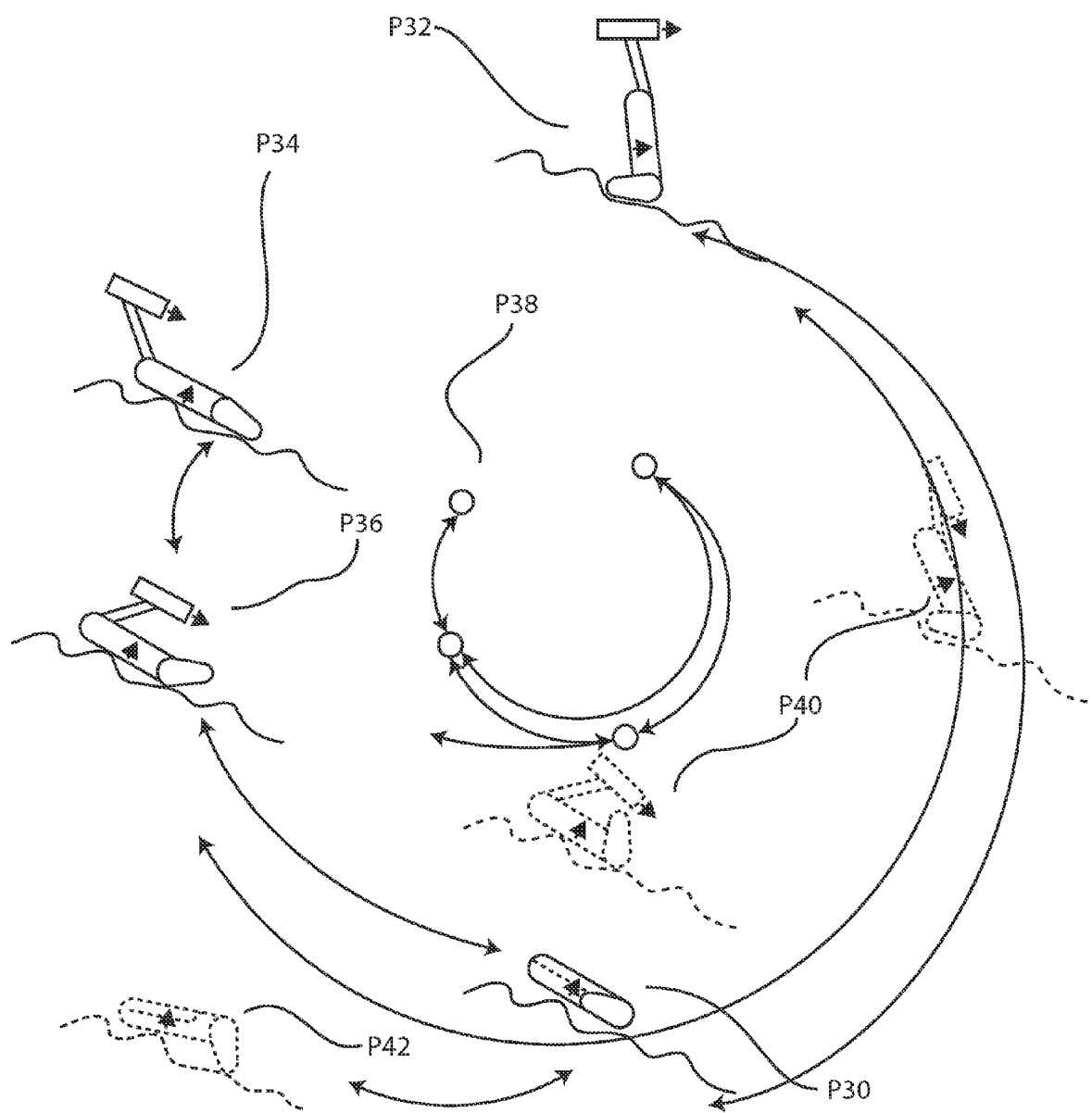
FIG. 15 illustrates another exemplary embodiment of custom robot poses activated using the control system of the present invention.

As shown in FIGS. 14 and 15, once a preconfigured pose available via a GUI, button, or other selection device has been selected, the robot must move some or all of its flippers, neck, head with respect to the robot main body and main drive in order to move from the present pose to the preconfigured pose (e.g., prairie dog P16, stowed P10, driving on a flat surface P14, driving on a bumpy or angled surface P20, stair climbing). Some robot configurations may use symmetric flipper arm and body (each the same size), providing alternative poses (e.g., inverted Y in which the body and/or head is positioned directly above a steepled symmetric flipper and body, inverted arrow in which body and/or head are positioned above V-oriented symmetric flipper and body—which may further require inverted pendulum gyroscopic balancing. Only a few exemplary poses are shown in FIGS. 14 and 15. As discussed here, actions by the robot cause the actuators of the robot to be driven under motor control and amplification as directed by the controller circuit on the robot itself.

Changing or returning to a preconfigured pose from any arbitrary pose may require determining the current position and orientation of the robot's body, drive or flipper arms, neck, and/or head. In an embodiment of the invention, the robot's movement is determined through the use of motor encoders (relative or absolute). In an embodiment, the robot's camera is mounted at a controllable height above the robot's body, and is controlled by the movement of the neck. At the top of the neck, a pan/tilt head with camera is mounted. The neck may contain a physical neck index switch that allows the system to reset the neck location in an absolute sense as the neck's movement passes through a specified location. By using the starting angle of the neck and motor encoders, the angular location of the neck at any given time can be calculated. Likewise, the pan and tilt position of the head camera can be calculated using the start locations. Alternatively, one or more of the flipper arm angle, neck angle, head angle (tilt) and head turn (pan) may use absolute encoders.

By using the current locations of each of the robot elements (body, flipper arm, neck, head pan, and tilt) via motor encoders or other proprioceptive sensing, the static geometry of the robot itself(for example, the length of the neck and its arc of travel, the distance from the center of rotation to the base of the neck, etc., as well as known x, y, z locations of the center of mass of each of the body, flipper arms, neck, head), and on-board orientation sensors in any robot element (accelerometers; tilt sensors; gyroscopes; and/or horizon detection), it is possible to produce a frame of reference for each robot element. In this case, each frame of reference is represented by a matrix giving the x, y, z location of the robot element and the rotation vectors for forward, left and up.

In an embodiment of the invention, a similar frame of reference can be created for each element using well-known Denavit-Hartenberg Parameter computations, e.g., going from the robot base toward the head and camera location. For example, the frame of reference for the neck can be computed using the body frame of reference, Denavit-Hartenberg Parameters describing the neck geometry, and the current neck angle of rotation. Using these three inputs, one can compute a new frame of reference for the neck. Similarly, the pan frame of reference is calculated, and then the tilt frame of reference is calculated. Because the camera is attached to the head, the frame of reference for the head is the frame of reference for the camera itself Such calculations from sensor data, performed on the robot itself, permit the robot's starting state to be determined, e.g., including the robot's location and vector (frame of reference) and the camera's location and vector (frame of reference). Note that not all of these are necessary—for a particularly robust robot, only the element configurations as expressed by the relative position of the body, flipper arms, neck, and head may be sufficient.

In the exemplary embodiment illustrated in FIG. 14, one technique of moving between positions is to map necessary states between preconfigured poses and current states, including necessary states P24. This state diagram shows that for some robot configurations, a loop among the states is not necessarily formed, and the path between intervening states may be limited to passing through particular sequences of intervening states. For example, as shown in FIG. 14, a robot in stowed pose P10 (solid lines indicating a preconfigured pose), with head and neck retracted and flippers aligned along the main tracks, may be placed in any of three exemplary preconfigured poses (prairie dog P16, bumpy travel P20, and flat travel P14).

In order to move to prairie dog pose P16, in which the robot is stably elevated on the flipper tracks with the neck elevated to a substantially maximum height, the robot must begin by lifting its body, turning its flipper tracks counterclockwise F-CCW (from the side shown in FIG. 14). It should be noted that there is no way for the robot to enter prairie dog pose by turning the flippers clockwise, as—given a realistic amount of mass in the robot body and center of gravity substantially toward the flipper end of the body—such turning will not tip up the robot body at the distal end but will only move the robot between flat and bulldog states (P22 intervening states). As the robot moves through intervening (not selectable via GUI or controller) poses P12, the center of mass/gravity of each of the body, neck, and head are maintained above the midpoint of the flipper arms. As shown in FIG. 14, this may be by specifying predetermined intervening states and actuations for the robot to pass through. For example, where "CW" is clockwise from the side shown in FIG. 14 and "CCW" is counter clockwise, first arranging the body and head above the arms by moving the body only via the flippers F-CCW, then by elevating the neck N-CCW and head H-CW, then by unfolding all at once vertically flipper F-CCW, neck N-CCW, and head H-CW. Note that there is no position past the prairie dog pose P16, and further rotation will cause the robot to fall over—an optional motion, and one which that can be specified as a preconfigured pose that the robot can be directed to or return from, e.g., stowed-upside-down.

In order to move back to the stowed position P10, or as shown in FIG. 14 to move to either of the driving positions P20 or P14, the robot moves back through the necessary states in the opposite order and with the opposite CW or CCW motions.

In order to move to, e.g., bumpy driving pose P20, in which the robot is stably positioned to be driven at slower speeds on the main tracks with the flipper tracks up to handle small obstacles, the neck and head positioned rear of the main body to provide a driving view but maximum static stability, the robot must begin by turning the flipper tracks clockwise F-CW (from the side shown in FIG. 14). It should be noted that there is no way for the robot to enter the driving poses (P20, P14) by turning the flippers counterclockwise, as such turning will tip up the robot body at the distal end and eventually flip the robot (e.g., via the P20 intervening states). As the robot moves through intervening (not selectable via GUI or controller) poses P22, the flipper arms move to a ready-for-driving (or climbing) position. As shown in FIG. 14, this may be by specifying predetermined intervening states and actuations for the robot to pass through (e.g., first arranging the flipper by moving only the flippers F-CW, then by elevating the neck N-CCW and head H-CW).

In order to move to, e.g., flat driving pose P14, in which the robot is stably positioned to be driven at higher speeds on the main tracks with the flipper tracks also in contact with the ground, the neck and head are positioned at the rear of the main body to provide a driving view but maximum moment about the leading end to resist flipping forward upon sudden stops or braking, the robot continues from the bumpy driving pose P20 by moving the flippers F-CW, elevating the neck N-CCW and tilting the head H-CW (from the side shown in FIG. 14). In order to "return" to any of the previous preconfigured poses, the robot must pass through the intervening preconfigured poses and intermediate poses.

As discussed, FIG. 14 demonstrates a model in which intervening and intermediate poses are predefined states on a closed, not necessarily looping, state map, in order to ensure that the robot does not tip over, self-collide, or inappropriately lose balance or pose in transitioning from a present pose to a preconfigured pose. This is a methodical, but less flexible, approach than having the robot actively maintain balance using proprioception, tilt, acceleration, and rotation (gyro) sensors.

FIG. 15 shows a model in which the robot, although passing through similar states, constantly monitors balance proprioception (position encoders), tilt, acceleration, and/or rotation (gyro) sensors. This system may deal more successfully with uneven ground (shown in FIG. 15) than a system using predefined positions. As shown in FIG. 15, a robot on level, tilted, or uneven ground in the stowed position P30 may be moved into any of the prairie dog pose (on uneven ground P32), flat driving pose (on uneven ground P34), and bumpy driving pose P36 by monitoring position encoding, calculating the overall center of gravity of the robot over that portion of the robot in contact with the ground (either the main body, the main body and flipper tracks, or flipper tracks alone), maintaining the individual centers of gravity of the body, flipper arms, neck, and head in positions over stable center of ground contact, and monitoring and/or controlling acceleration and movement of the elements to obtain relative tilt, orientation to terrestrial gravity, and/or static and/or dynamic stability. As shown in FIG. 15, because the preconfigured poses are reached by active monitoring and control of balance, the robot need not pass through all preconfigured intermediate pose states, but will pass through arbitrary, yet stable and balanced poses P40 on its way from one pose to another (e.g., from bumpy driving P36 to prairie dog P32 without passing through the stowed configuration P30). As such, the state map P38 will permit direct transition from one preconfigured pose state to another through a continuously changing, but continuously balanced pose transition, and from arbitrary current poses P42 directly to preconfigured poses P30 via a continuously changing, but continuously balanced pose transition (alternatively, a succession of continuously balanced pose transitions). The robot may also seek preconfigured poses by moving only from a present position into a confined solution space of next positions that includes only balanced poses.

It should be further noted that the robot can be controlled to actively return to the preconfigured pose set when disturbed via the continuously balanced pose transition, including a self-righting routine intervening before the robot seeks the last set preconfigured pose. For example, if the robot is temporarily forced into a different pose, or is tipped over or otherwise disturbed, using tilt sensors, proprioceptive encoders, accelerometers, and/or gyro sensors, it may detect this and initiate seeking of the predetermined pose.

Other Autonomous Assist Functions

Autonomous assist functions, in an embodiment of the invention, reside on the robotic platform in memory, and are executed by the robot's on-board computers. Examples of at least two types of behaviors are described herein: Ballistic and Persistent/Continuous.

Ballistic Behaviors—Stair Climbing

The stair climbing behavior is an example of ballistic (operator-initiated) behavior that drives the robot to traverse a set of stairs in an autonomous manner, after receiving a command to initiate the behavior and information indicating the location of the stairs from the operator. The robot may include a pitch/roll sensor that indicates whether the robot is tilted relative to the ground, which is used by the stair climbing behavior to decide whether the robot should continue climbing the stairs.

As an advantage, the robot can be positioned in the vicinity of a staircase and the operator may initiate the autonomous stair climbing behavior by simply identifying the location of the stairs and inputting a command to activate the stair climbing behavior. The robot can then ascend or descend the stairs without requiring further input from the operator.

Figure 16:
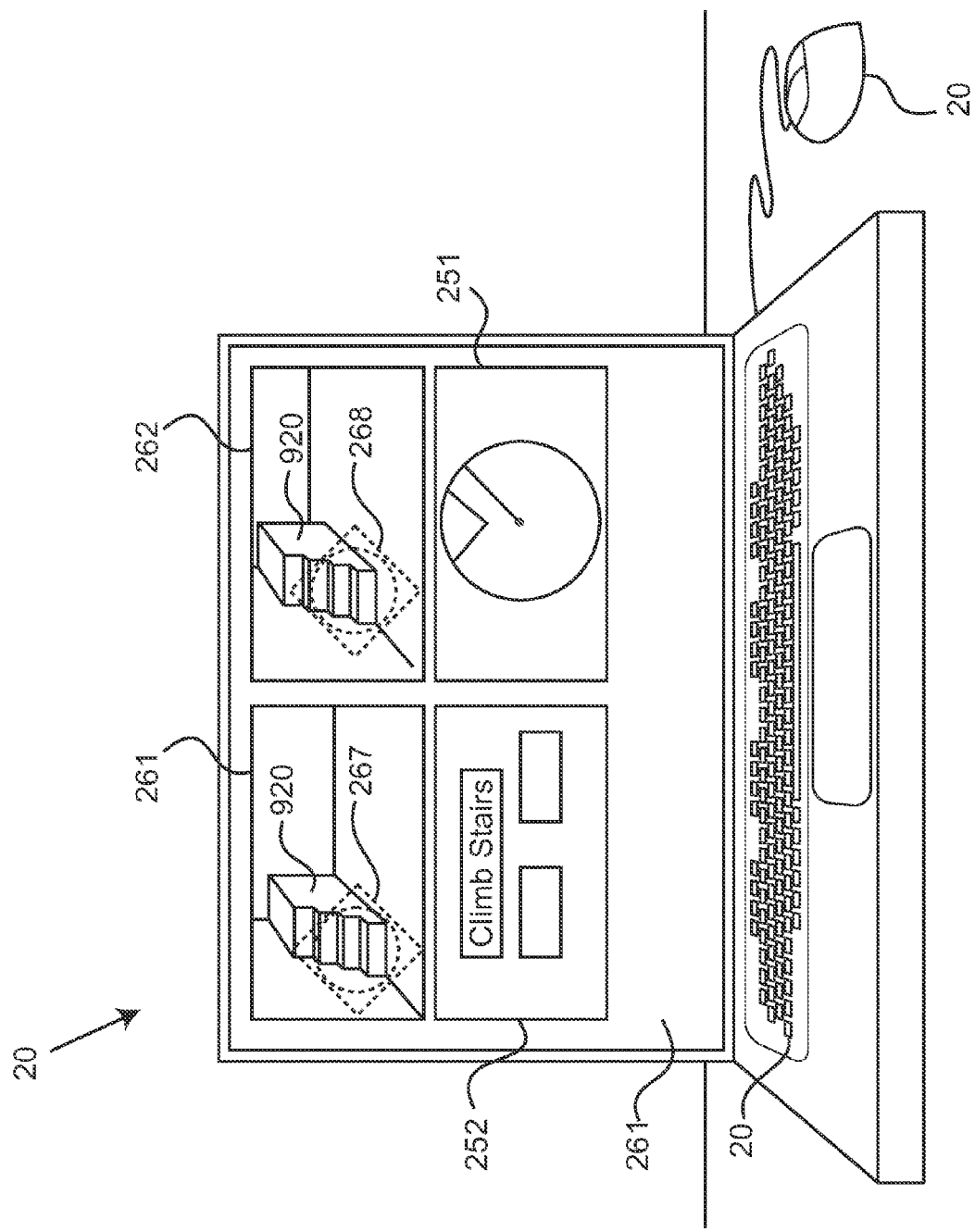
FIG. 16 illustrates initiation of a stair climbing autonomous assist behavior activated using the control system of the present invention.

Referring to FIG. 16, a stair climbing behavior is initiated when the operator navigates the robot to within a threshold distance of the stairs, such that the stairs are visible in the image displayed both in the drive camera window 261 and the attack camera window 262. The operator then positions a first selector 267 so as to enclose or abut a region of the window 261 corresponding to the stairs, and similarly positions a second selector 266 onto a region of the attack camera window 262 that also corresponds to the stairs. The control system of the present invention contemplates initiating a stair climbing behavior using the above described GUI and soft buttons mapped to buttons on the hand-held controller.

When the target stairs 920 are identified by the first and second selectors 267, 266, respectively, the operator can then trigger the stair climbing behavior by clicking an on-screen icon as shown in the window 252, a button on the hand-held controller, or otherwise inputting a command that causes transmission of a control signal that activates the stair climbing behavior. In accordance with another embodiment, the operator further inputs whether the robot should climb up the stairs or descend the stairs. In yet another embodiment, the robot includes a routine for autonomously determining whether the target stairs 920 are ascending or descending relative to the robot, and informs the stair climbing behavior accordingly.

Figure 17A:
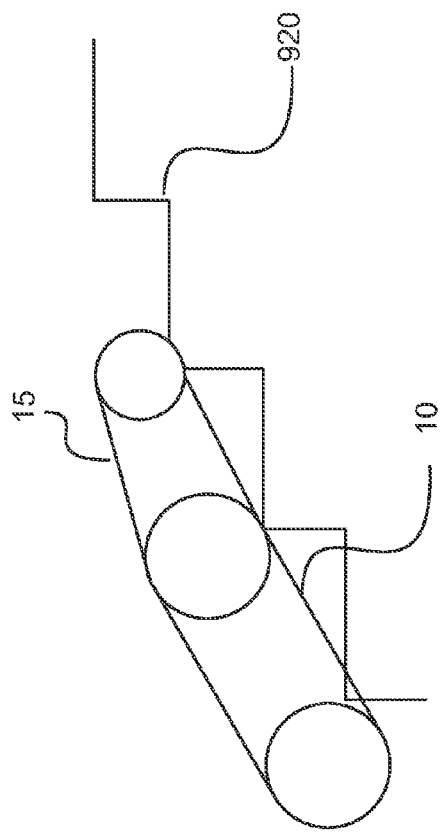
FIGS. 17A and 17B illustrate positions of a remote vehicle relative to target stairs as the remote vehicle ascends or descends the stairs in accordance with a stair climbing autonomous assist behavior activated using the control system of the present invention.
Figure 17B:
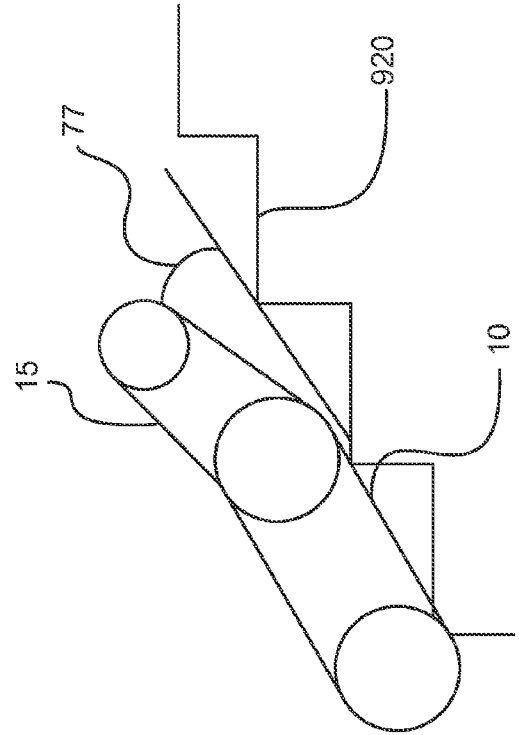

FIGS. 17A and 17B illustrate positions of the robot relative to the target stairs 920 as the mobile robot ascends or descends the stairs 920 in accordance with the stair climbing behavior. The robot may initially extend its flippers 115 to a predetermined angle (e.g., angle 77 in FIG. 17B), in order to facilitate the stair climbing operation. As an example, FIG. 17A shows the flippers 115 rotated out to about a 180 degree angle relative to the main treads 110, to ensure contact with the stairs 920 and to raise the front end of the robot up onto the stairs 920. When descending, the robot may instead extend the flippers to an angle 77 that is approximately 45 degrees relative to the main treads 110 (see FIG. 17B).

When a tilt sensor on the robot indicates that the angle of tilt of the robot is zero relative to the horizon, the stair climbing behavior may stop and navigation authority may be resumed by another routine.

Figure 18:
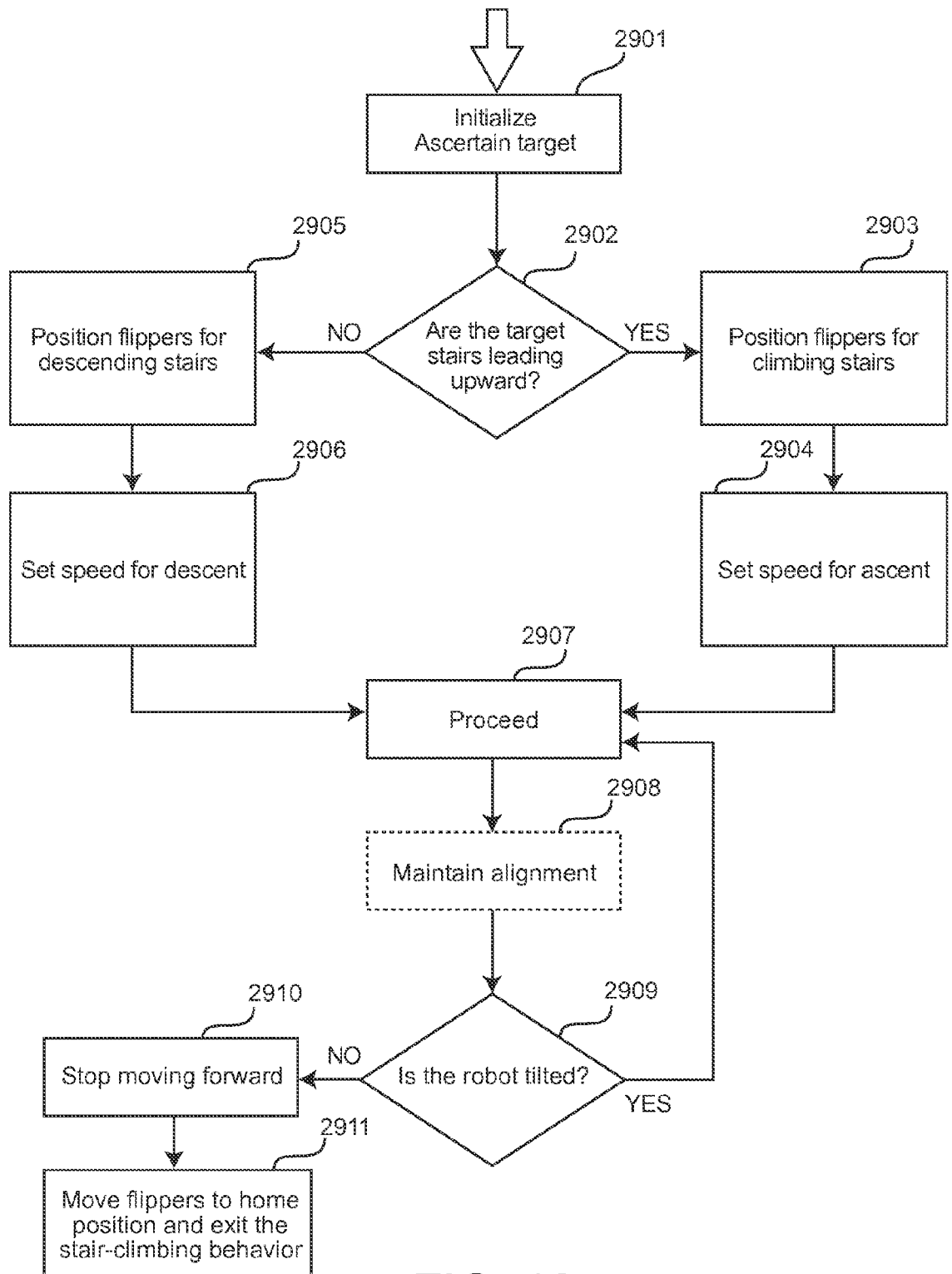
FIG. 18 illustrates an exemplary method for performing a stair climbing behavior activated using the control system of the present invention.

FIG. 18 shows an exemplary method for performing the stair climbing behavior. At step 2901 the behavior initializes internal variables (such as by setting the initial turn rate and roll rate to zero, for example), then determines at step 2902 whether the robot should ascend the stairs. If so, the mobile robot positions the flippers 115 to the appropriate angle for ascending the stairs 920 at step 2903, outputs a speed value for ascending the stairs 920 at step 2904; and proceeds to traverse the stairs 920 for one cycle at step 2907. In an embodiment of the invention, the robot may ascend the stairs at a predetermined speed while under control of the stair climbing behavior, such as 0.2 meters per second.

If instead the robot is determined at step 2902 not to be intended to ascend the stairs 920, then the behavior positions the flippers 115 to an angle appropriate for descending the stairs 920, sets a speed appropriate for descending stairs, and proceeds to navigate the stairs 920 for a cycle at step 2907. Thereafter, the behavior may optionally perform steps to maintain the robot's alignment with the stairs (in order not to inadvertently fall off the side of unprotected stairs, for example) at step 2908, and then determines at step 2909 whether the tilt sensor indicates the existence of tilt.

If tilt exists, the behavior continues to ascend the stairs 920 autonomously by returning to step 2907. Otherwise, step 2910 stops the robot from proceeding further, and returns the flippers 115 from the ascending or descending position back to the neutral, undeployed position at step 2911.

In an embodiment of the invention, in order to ascertain whether there are additional stairs to traverse, the stair climbing behavior may use a median pitch filter routine to integrate tilt sensing information from multiple sources, and to reduce false positive determinations of being level. The median pitch filter routine can track pitch information from the tilt sensor and use only those values that fall within the median of all previously recorded values. Accordingly, the routine can reduce the detrimental impact of transient values on the determination of whether the stair traversal is complete.

In accordance with an embodiment of the invention, the median pitch filter routine stores native pitch/roll sensor output into memory. An on-board timer then increments and the routine periodically checks whether it has been incremented by a full half second. If so, then the routine moves on to the next step; otherwise, the routine stores the tilt sensor output, and increments the timer.

The median pitch filter routine then examines the pitch/roll sensor native output over the full half second and determines the respective highest and lowest frequencies of the signal.

Using this information, the median pitch filter routine then calculates the median frequency. The median pitch filter routine outputs this calculated median frequency as the pitch/roll sensor output to the robot's control assembly.

The maintain alignment routine may be used by the stair climbing behavior to keep the robot moving in a consistent direction with respect to the vertical axis of movement, and allows the robot to ascend or descend stairs with a turn rate magnitude of zero.

While moving forward with a zero turn rate, for example, the routine simultaneously samples the roll angle as determined by the pitch/roll sensor output and subsequently calculates a turn rate magnitude from the output.

In an embodiment of the invention, the equation by which the turn rate magnitude is calculated may be approximately k*X degrees per second, in which k is a constant having a value within the range of 1110 to 3 and X represents the roll angle. Other embodiments may either use differing formulas.

At one step, the routine checks the roll angle to determine whether it is a value other than zero. If so, then the routine returns to the first step and moves forward with a roll angle of zero. Otherwise, the routine re-aligns the robot by turning the robot by the calculated turn rate magnitude. Once the robot is re-aligned, the process goes back to the first step and continues to climb forward with a roll angle of zero.

This embodiment of stair climbing behavior, which utilizes a tilt sensor, allows the robot to position itself without the need for walls. Alternatives include the use of a SICK LIDAR sensor to detect walls to position the robot as the robot moves up the stairs. Other alternatives include the use of SONAR to detect walls and position the robot as it moves up the stairs. Further alternatives include a fully autonomous version of stair climbing that is implemented upon the detection of stairs. Such a version may include a sensor placed towards the outer rim of the robot's lower chassis to detect negative obstacles such as downward stairs, or may require multiple sensors to indicate that there is an obstacle within the allowed height, meaning that software routines within the robot would associate certain dimensions with stairs. Still other alternatives include a routine that commands the robot to re-position its arms to 180 degrees when it reaches the top of the stairs, or a robot that utilizes a magnetic compass or IMU in addition to or in lieu of a tilt sensor.

Other possible ballistic autonomous assist behaviors include, for example, preset action sequences, autonomous flipper behavior that allows an operator to operate the robot manually while the flippers are in an autonomous mode due, perhaps, to difficult terrain conditions, retrotraverse to autonomously navigate the robot back along a return path, speed boost, and quick brake.

Persistent Autonomous Behaviors—Cruise Control

The cruise control behavior receives information from the operator regarding an intended constant speed and heading for the robot. The information sent by the operator typically includes an acceleration value and a rotational velocity, both of which are used by the robot to determine a drive velocity and heading. Preferably, the operator would use a left and right puck or joystick included on the hand-held controller to control the robot's movement. In an embodiment of the invention, the left puck controls the cruise control behavior such that when the left puck is actuated, the cruise control behavior commences, and when the right puck is actuated, the cruise control behavior halts. Alternatively, the cruise control behavior could commence following the actuation of an icon, button, or other actuator located on the hand-held controller.

In an embodiment of the invention employing a puck for cruise control, each puck may have the ability to rotate about a vertical axis, translate forward and backward about a horizontal axis and further tilt away from the vertical axis. Furthermore, when the puck is translated, rotated or tilted; it is preferable that such movements correspond to different movements of the robot. In particular, driving the robot in a forward or backward direction is preferably controlled by the translation of the puck about a horizontal axis, alteration of the robot's heading is controlled by the rotation of the puck about a vertical axis, and actuation of the flippers included on the robot are controlled by tilting the pucks. A particular example of the movement of the robot in response to the movement of a puck, is one in which the puck is rotated about the vertical axis 30° in a clockwise direction, and the puck is moved forward a distance of one-half inch. In response, a robot at rest will adjust its heading by turning 30° in a clockwise direction, and driving forward at a velocity equivalent to a pre-determined value associated with movement of the puck one-half inch. Should the puck be tilted to the right 15° from the normal, the robot's flippers could respond by rotating towards the ground an angle equivalent to 15°.

Figure 19:
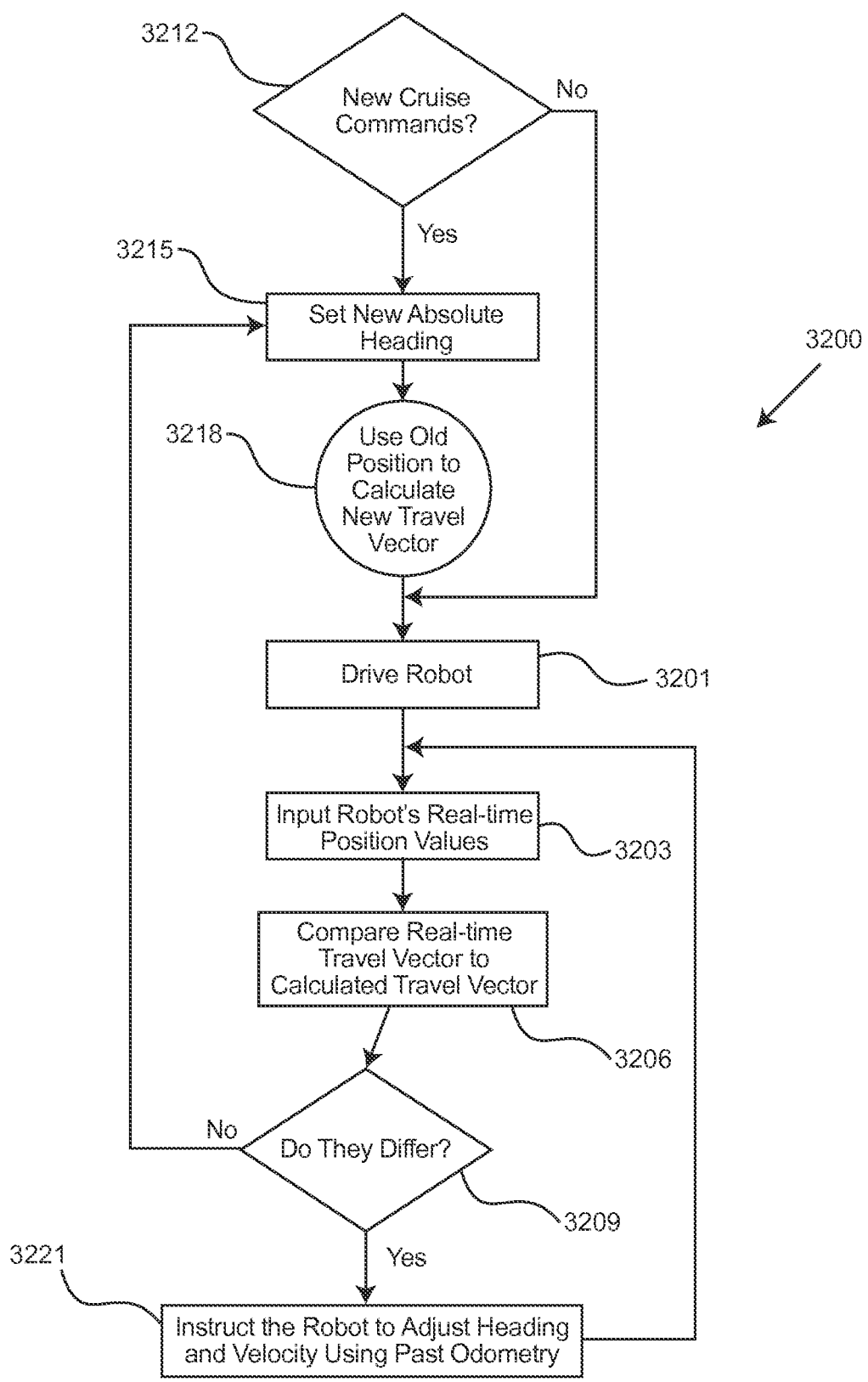
FIG. 19 illustrates a cruise control routine included within a cruise control autonomous assist behavior activated using the control system of the present invention.

FIG. 19 illustrates a cruise control routine 3200 included within the cruise control behavior. When in control of its corresponding actuators, the cruise control behavior executes the cruise control routine 3200 which commences by scanning for a new set of cruise commands 3212 from the control system, also referred to as the operator control unit 20. Should the routine sense a new set of cruise commands, the routine will then input these commands as an absolute heading 3215. Since there is often a time lag between when the robot's cameras record video information and the time that such information is displayed to the operator, a situation can arise when the robot is moving at a particular speed and particular heading, and a new heading and/or speed is chosen by the operator and sent to the robot. In such a situation, the robot will have moved a certain distance during the time between when the robot's camera detected the image, and the image is displayed to the operator. The latency of the system can cause discrepancies when sending the robot cruise commands. To eliminate these discrepancies, in an embodiment of the invention, the operator sends the robot an absolute heading and velocity. When the robot receives the absolute heading and velocity, the robot then calculates its new heading and velocity using the absolute heading and velocity and the positional and velocity values at the time the robot's camera detected the image, rather than the current real-time positional and velocity values. Upon calculating the new travel velocity and heading, the robot uses real-time positional and velocity values to calculate a new travel vector 3218.

Once a travel vector 3218 is calculated, the robot will then drive at the specified velocity and using the specified heading 3201. While driving, the cruise routine gathers real-time positional and velocity values from sensors 3203 and compares these values to the chosen travel vector 3206. Should there be a significant difference between the current travel vector and the chosen travel vector, the routine instructs the robot to adjust its heading and velocity 3221 using past odometry values. If there is less than a predetermined difference between the current travel vector and the chosen travel vector, the routine will instruct the robot to continue driving 3201. Further illustrative of the robot's implementation of cruise control, FIGS. 20A and 20B display a robot 3444 that responds to new heading commands to change direction. The robot 3444 moves forward in a particular direction 3440. Once the operator control unit 20 retrieves video feedback of the robot's position, the robot's position has changed from its position at the time the video information was captured 3446 to its current position 3244. Thus, the robot has continued along its current path 3440 during the time between when the robot collects video information of its position at that time 3446 and the time when the robot receives new heading commands from the operator control unit 20. When the operator control unit 20 sends the heading information to the robot 10, the heading information 3442 is relative to the robot's previous position 3446. FIG. 20B displays how the robot uses the heading 3442 generated in relation to the robot's previous position 3446 to determine a new heading 3452 calculated in relation to the robot's current position 3444.

Figure 21:
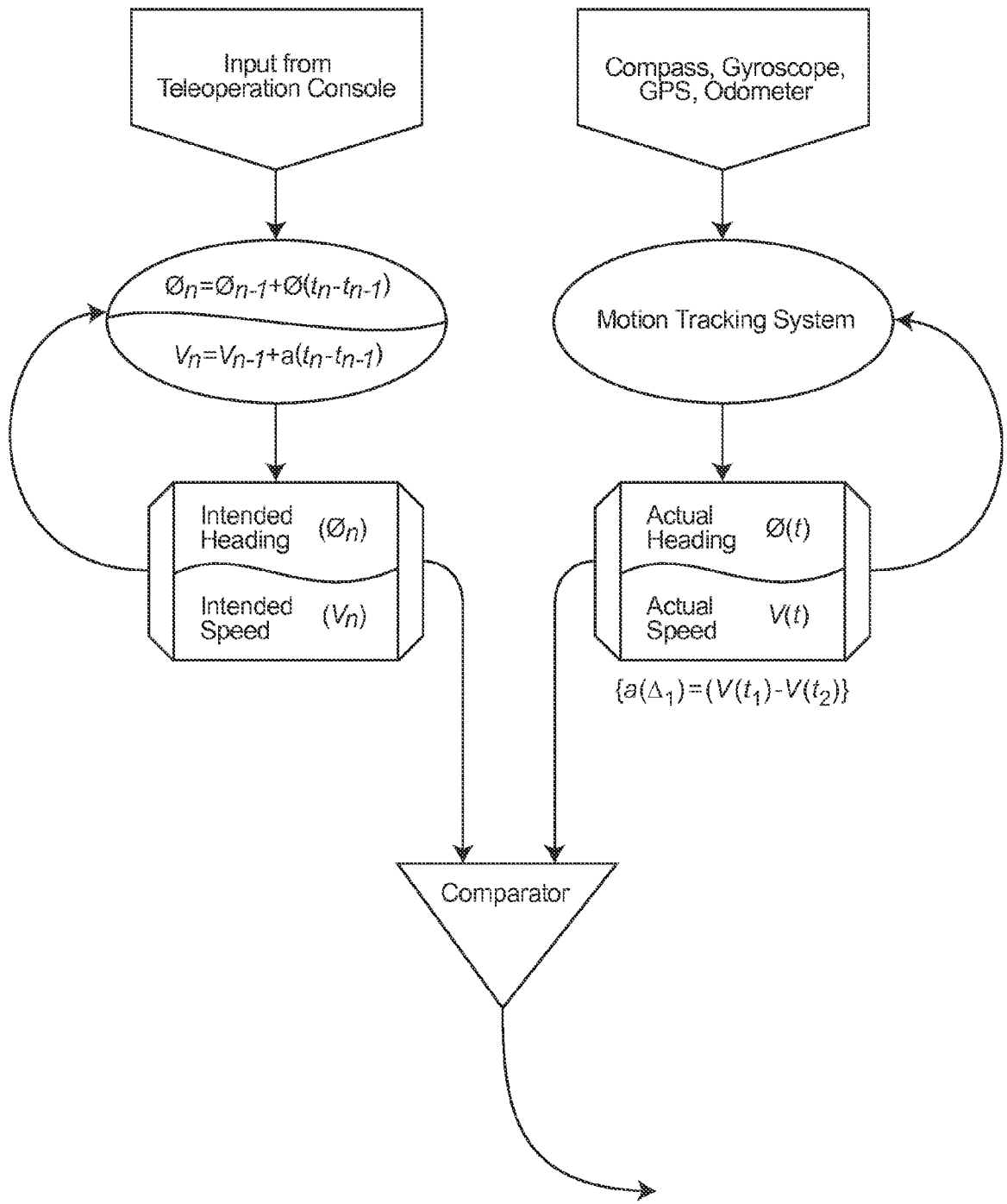
FIG. 21 illustrates a flow chart showing the flow of information according to an embodiment of a cruise control autonomous assist behavior activated using the control system of the present invention.

FIG. 21 illustrates an example flow of information in the cruise control behavior. Input from the operator control unit is received and processed to produce an updated current intended heading and speed $\theta_n$, $v_n$. In the equations displayed, $\theta_{n-1}$ is the intended heading of the preceding cycle, $t_n$ is the time of the current cycle, $t_{n-1}$ is the time of the preceding cycle, $\theta(t_n - t_{n-1})$ is the angular difference between the heading of the current cycle and the heading of the preceding cycle, $v_{n-1}$ is the intended speed of the preceding cycle, and a $(t_n - t_{n-1})$ is the difference between the speed of the current cycle and the speed of the preceding cycle.

Simultaneously, input from position reckoning systems (e.g., a compass, IMU, and/or GPS system) is fed to a motion tracking system, which updates the reckoned actual heading and speed. The reckoned actual speed and heading of the robot, as well as the updated intended heading and speed, are passed to a comparator, which generates an appropriate output (such as turn rate and drive motor current) to control the drive system.

Figure 22:
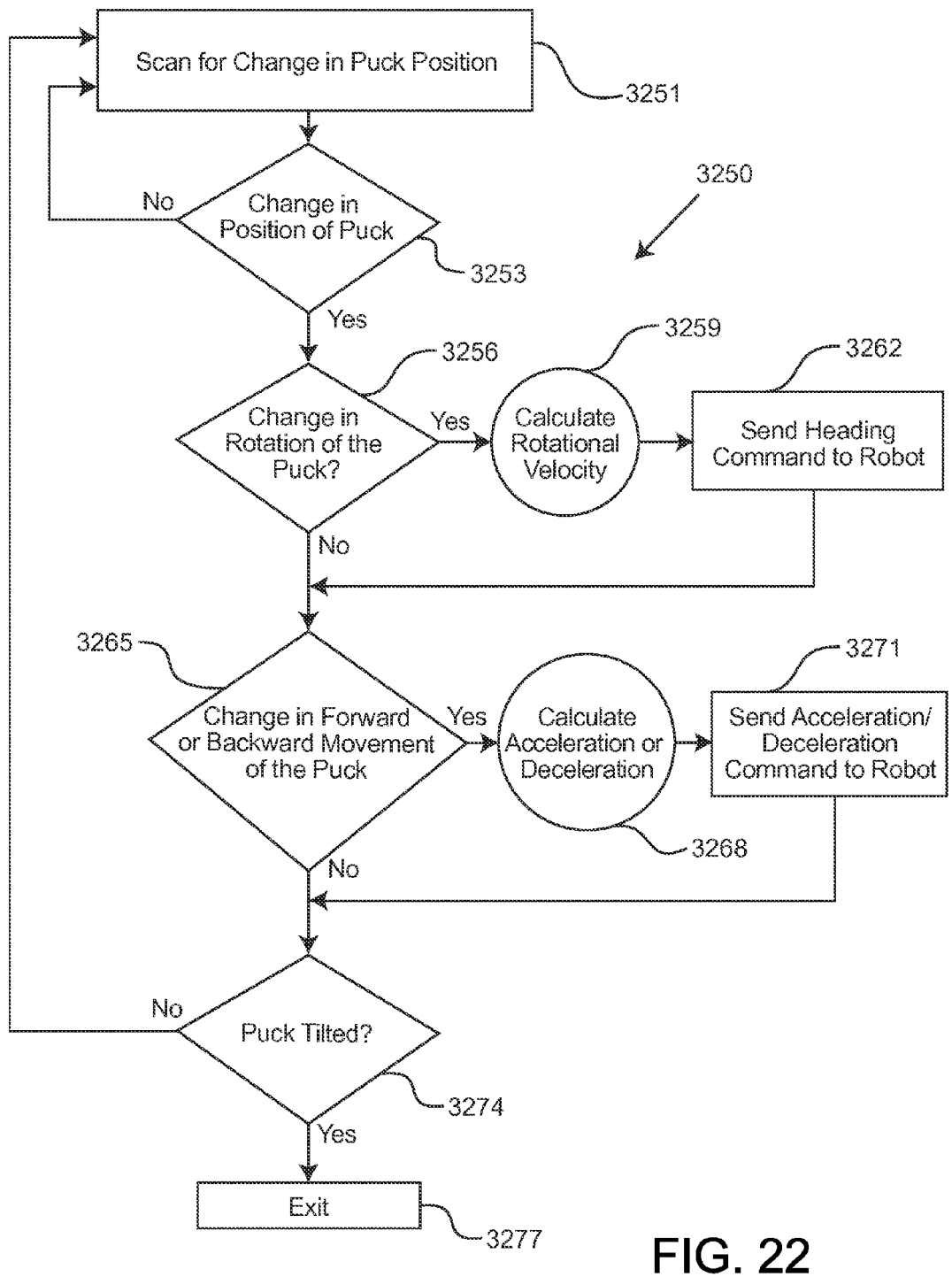
FIG. 22 illustrates an embodiment of a routine carried out to generate cruise commands of a cruise control autonomous assist behavior activated using the control system of the present invention.

FIG. 22 illustrates the routine carried out to generate cruise commands. The routine scans a puck designated for activating and controlling the cruise control behavior 3251, should the routine detect a change in the position of the puck 3253, the routine will then verify if the change included a rotation of the puck about a vertical axis 3256, otherwise the routine will continue to scan the puck's position. If the change included a rotation of the puck about a vertical axis 3256, then the routine will calculate a rotational velocity proportional to the rotation of the puck and indicative of the direction the puck was rotated 3259, and send the new drive heading to the robot 10 where the heading is relayed to the cruise control behavior. Thereafter, the routine determines whether or not the puck was translated about a horizontal axis 3265. If so, the routine will then calculate an acceleration/deceleration command 3268 representative of the puck's movement and send the acceleration/deceleration command 3271 to the robot for relay to the cruise control behavior. Should the routine detect a tilting of the puck 3274, the routine will exit 3277 because such a movement of the puck indicates flipper movement which is controlled by a behavior other than the cruise control and so activation of another behavior causes cruise control to halt. If the routine does not detect a tilting of the puck 3274, the routine will then continue to scan the puck's position 3251.

Figure 23:
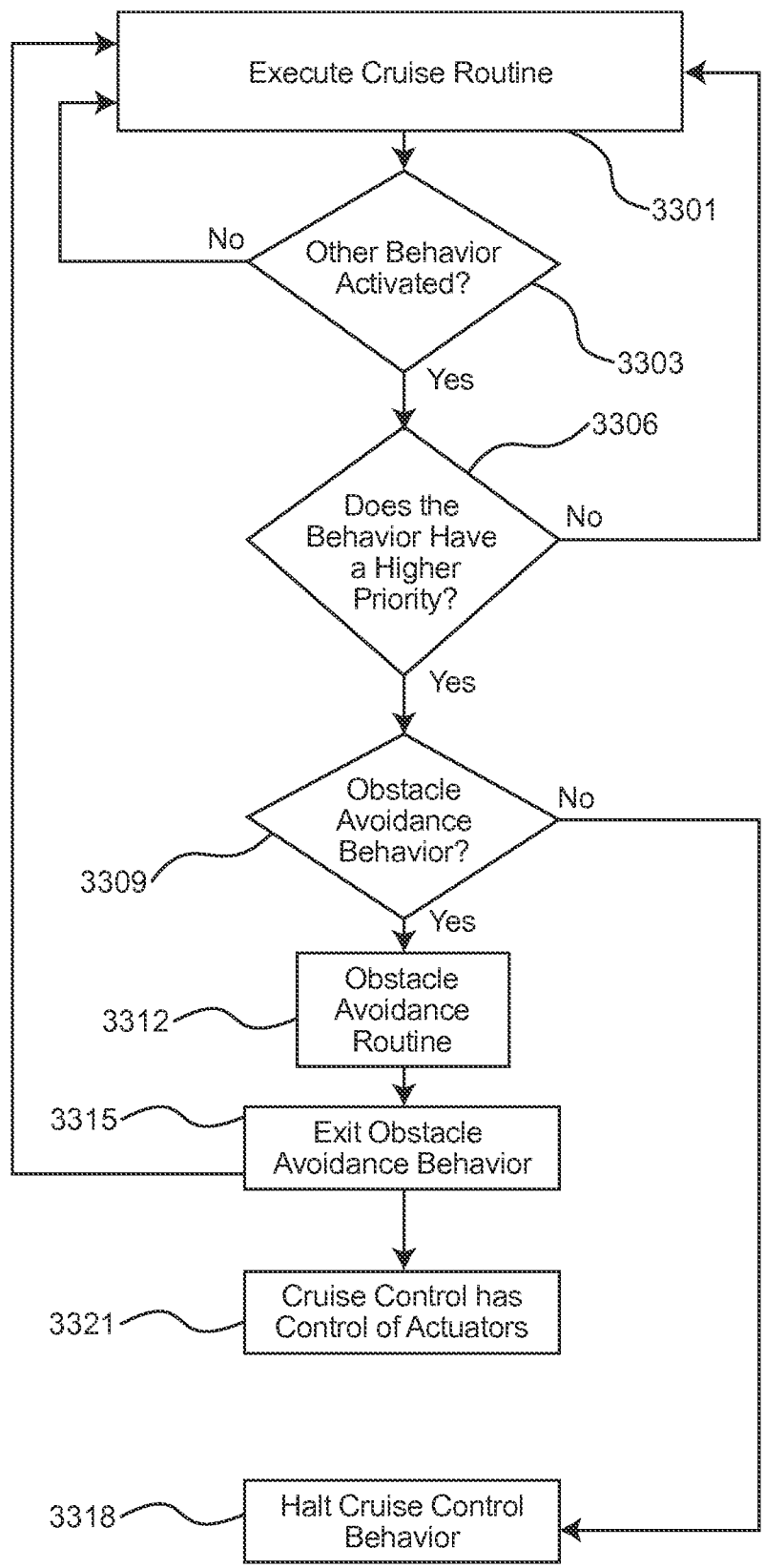
FIG. 23 illustrates an exemplary embodiment of an interaction between a cruise control autonomous assist behavior and other behaviors installed on the remote vehicle's onboard computer.

FIG. 23 illustrates an exemplary embodiment of the interaction between the cruise control behavior and the other behaviors installed on the robot's single board computer. When the cruise control behavior has control of the robot's actuators, it executes its cruise routine 3301. However, when the coordinator indicates that another behavior has been activated 3303 and that behavior has a higher priority 3306 than the cruise control behavior, it is likely that the cruise behavior will be halted and the cruise routine exited 3318. Otherwise, if the coordinator does not indicate that another behavior has been activated 3303, or if a behavior has been activated but that behavior does not have a priority 3306 greater than the cruise control behavior; then the cruise routine will continue to execute 3301. When a behavior with a higher priority than cruise control is activated, the coordinator the cruise control behavior checks whether this behavior is the obstacle avoidance behavior 3309, and if true, allows the obstacle avoidance behavior to have control of the actuators. Otherwise, if the obstacle avoidance behavior is not identified and the behavior has a higher priority than the cruise control behavior, the cruise control behavior will exit the cruise routine and halt 3318. Should the obstacle avoidance behavior gain control of the actuators, an obstacle avoidable routine will then be executed 3312 by the obstacle avoidance behavior. Once the obstacle avoidance behavior is executed and exited, the obstacle avoidance behavior will then allow cruise control to have control of the actuators 3321. Once in control of the actuators, the cruise control will pick up where it left off and begin executing the cruise routine 3301. Within the cruise routine 3200, a check is made of the robot's real-time travel vector 3203. Since the obstacle avoidance routine caused the robot to veer away from the chosen travel vector, cruise routine will detect the change in travel vector and correct the robot's heading and velocity 3221 using past odometry values and so that the robot returns to the chosen travel vector.

An embodiment of the invention illustrating the interaction between the cruise control behavior and the obstacle avoidance behavior is displayed in FIGS. 24A-24D. FIG. 24A displays movement of the robot 3458 along the chosen travel vector 3456 dictated by the cruise control behavior, where the vector 3456 points the robot toward an obstacle 3454. FIG. 24B illustrates the robot's response to the obstacle 3454 by commanding the robot to drive to a position 3460 within the environment not included within the chosen travel vector, which position 3460 is the result of an avoidance travel vector 3462 instituted by the obstacle avoidance behavior to cause the robot 10 to avoid the obstacle 3454.

Once the obstacle 3454 is avoided, the cruise control behavior resumes control and, as displayed in FIG. 24C, begins to adjust the robot's direction of movement so that the robot will return to a path included within the chosen travel vector 3456. To do this, the cruise control behavior alters the robot's heading so that the robot will drive along a path included within a translational vector 3462 calculated to cause the robot 3460 to return to the chosen travel vector 3456. FIG. 24D displays the final effect of the translational vector 3462 in that the robot 3458 moves from a path included within the avoidance travel vector 3462 to a path within the chosen travel vector 3456.

In an embodiment of the invention, the cruise control behavior assumes that the robot is moving at a velocity of 0 m/s, and considers the robot's position to be the normal position. Subsequent rotational velocities and accelerations/decelerations are an alteration of the robot's 0 m/s velocity and normal position. Alternatively, the cruise control behavior could include cruise routines that allow for acceleration and/or decelerations of a robot with a velocity other than 0 m/s. In such an embodiment, an additional actuator may be included on the operator control unit 20 so that the user can control activation of cruise control with an actuator separate from the puck.

Other preferable features of the cruise control behavior are fail safe conditions that cause the cruise control behavior to halt. These conditions include actuating brakes included within the drive system, utilizing the right puck or the puck not designated to control the cruise control behavior, the depression of a brake button, a change in drive mode, or a drop in communication with the robot 10. Additionally, there is a maximum speed at which the robot can go and the robot is configured not to drive at a speed higher than the maximum speed.

The present invention contemplates alternative methods of implementing the cruise control behavior, for example including setting a point far in the distance and driving towards that point, so that when a behavior like obstacle detect interrupts, the cruise behavior can calculate a path from the robotic platform's current position back to the original cruise path, or calculate a new path from the robotic platform's current position to the destination point.

The present invention contemplates control of a wide variety of autonomous assist behaviors. Other autonomous assist behaviors may include, for example: "circle vehicle" where a vehicle is aligned using wireframe indicia and the remote vehicle follows an odometry—estimated square around the vehicle, keeping its camera pointed to the estimated center of the square; retrotraverse; go to stow position; go to prairie dog position; go to prairie dog position and pan camera back and forth; scan 360 degrees; and scan 720 degrees.

Exemplary Operational Scenarios

The control system of the present invention is used to control a remote vehicle in a variety of missions. Some exemplary operational scenarios (missions) include abandoned vehicle searches, vehicle checkpoint searches, urban assault—clearing the enemy from a geographical area, building searches, cave/tunnel/sewer clearing, and encampment perimeter security. A number of implementations have been described. Nevertheless, it will be understood that various modifications may be made without departing from the spirit and scope of the disclosure. Accordingly, other implementations are within the scope of the following claims.

What is claimed is:

1. A hand-held controller for operating a remote vehicle, the hand-held controller comprising:
    a controller body having right and left grips;
    a first set of input devices disposed in a left control zone adjacent the left grip, the first set of input devices including:
        a first analog joystick;
        a 4-way directional control adjacent the first analog joystick; and
        a left rocker control located adjacent the 4-way directional control;
    a second set of input devices disposed in a right control zone adjacent the right grip, the second set of input devices including:
        a second analog joystick;
        an array of at least four buttons adjacent the second analog joystick; and
        a right rocker control adjacent the button array;
    a mode changer disposed on the controller body and configured to receive an input to change between two or more function modes, each function mode assigning different functions to one or more of the input devices; and
    a speed toggle disposed on the controller body and configured to receive an input to change between two or more speed modes.

2. The hand-held controller of claim 1, wherein the speed modes include a first speed mode for ascending stairs and a second speed mode for descending stairs.

3. The hand-held controller of claim 1, wherein the speed modes includes a cruise control mode for driving the vehicle at a constant speed and heading.

4. The hand-held controller of claim 1, wherein the two or more function modes include a drive mode to drive the remote vehicle and a manipulate mode to manipulate one or more components of the remote vehicle.

5. The hand-held controller of claim 1, further comprising a pose control configured to receive input to execute one or more poses of the remote vehicle.

6. The hand-held controller of claim 5, wherein the one or more poses includes a drive pose or at least one position of at least one component of the remote vehicle.

7. The hand-held controller of claim 6, wherein the at least one component comprises a rotatable flipper, an articulated head, an articulated neck, or a camera.

8. The hand-held controller of claim 1, wherein the first joystick controls forward, backward, left and right drive directions of the remote vehicle and the second joystick controls a pose of a camera on the remote vehicle.

9. The hand-held controller of claim 1, wherein one of the rocker controls is rotatable to control a rotational position of a flipper of the remote vehicle.

10. The hand-held controller of claim 1, further comprising a button disposed on the controller body and pressible to stop a motor of the remote vehicle.

11. The hand-held controller of claim 1, wherein the left grip defines a geometry that permits a user to operate the first set of input devices with a left index finger, a left middle finger, and a left thumb.

12. The hand-held controller of claim 1, wherein the right grip defines a geometry that permits a user to operate the second set of input devices with a right index finger, a right middle finger, and a right thumb.

13. The hand-held controller of claim 1, further comprising a button disposed on the controller body and pressible to control one or more payloads of the remote vehicle with the at least one of the input devices.

14. The hand-held controller of claim 1, wherein the payload comprises a controllable camera or manipulable arm.

15. The hand-held controller of claim 1, further comprising a tether disposed on the controller body outside of the left and right control zones, the tether providing wired communication with the remote vehicle.

16. The hand-held controller of claim 15, wherein the tether comprises a fiber optic cable.

17. The hand-held controller of claim 15, further comprising a tether zone between the left control zone and the right control zone, the tether zone including a tether anchor configured to tether the controller body between the left grip and the right grip and to permit the hand-held controller to hang with the left grip and right grip pointing upward.

18. The hand-held controller of claim 17, further comprising a tether extending from the tether anchor, the tether including a strain relief section.

19. A hand-held controller for operating a remote vehicle, the hand-held controller comprising:
    a controller body having right and left grips;
    a first set of input devices disposed in a left control zone adjacent the left grip, the first set of input devices including:
        a first analog joystick;
        a 4-way directional control adjacent the first analog joystick; and
        a left rocker control located adjacent the 4-way directional control, the left rocker control having a first left rocker button and a second left rocker button, the left rocker control pivoting from a neutral position to one of the first left rocker button and the second left rocker button;

a second set of input devices disposed in a right control zone adjacent the right grip, the second set of input devices including:

a second analog joystick;

an array of at least four buttons adjacent the second analog joystick; and a right rocker control adjacent the button array, the right rocker control having a first right rocker button and a second right rocker button, the right rocker control pivoting from a neutral position to one of the first right rocker button and the second right rocker button;

a mode changer disposed on the controller body and configured to receive an input to change between two or more function modes, each function mode assigning different functions to one or more of the input devices; and a speed toggle disposed on the controller body and configured to receive an input to change between two or more speed modes.

20. The hand-held controller of claim 19, wherein the two or more function modes include a drive mode to drive the remote vehicle and a manipulate mode to manipulate one or more components of the remote vehicle.

* * * * *